United States Patent
Jacob

(10) Patent No.: US 12,010,241 B2
(45) Date of Patent: Jun. 11, 2024

(54) DISTRIBUTED LEDGER SYSTEM

(71) Applicant: Bejoy Jacob, Bonn (DE)

(72) Inventor: Bejoy Jacob, Bonn (DE)

(73) Assignee: Bejoy Jacob, Bonn (DE)

( * ) Notice: Subject to any disclaimer, the term of this patent is extended or adjusted under 35 U.S.C. 154(b) by 205 days.

(21) Appl. No.: 17/520,914

(22) Filed: Nov. 8, 2021

(65) Prior Publication Data

US 2022/0150072 A1    May 12, 2022

(30) Foreign Application Priority Data

Nov. 11, 2020    (EP) .................................... 20206873

(51) Int. Cl.
| | |
|---|---|
| *H04L 29/06* | (2006.01) |
| *G06F 16/27* | (2019.01) |
| *H04L 9/30* | (2006.01) |
| *H04L 9/32* | (2006.01) |
| *H04L 67/104* | (2022.01) |
| *H04L 9/00* | (2022.01) |

(52) U.S. Cl.
CPC ............ *H04L 9/3239* (2013.01); *G06F 16/27* (2019.01); *H04L 9/3073* (2013.01); *H04L 9/3213* (2013.01); *H04L 67/104* (2013.01); *H04L 9/50* (2022.05)

(58) Field of Classification Search
CPC ... H04L 9/3239; H04L 9/3073; H04L 9/3213; H04L 67/104; H04L 9/50; H04L 9/3247; H04L 63/123; G06F 16/27; G06F 21/64; G06F 21/602; G06F 21/6227; G06Q 40/04; G06Q 20/3829
See application file for complete search history.

(56) References Cited

U.S. PATENT DOCUMENTS

| | | | |
|---|---|---|---|
| 10,805,069 B1 * | 10/2020 | Irwan .................. | H04L 63/0442 |
| 11,100,197 B1 * | 8/2021 | Bernardi .............. | H04L 9/3239 |
| 11,843,693 B2 * | 12/2023 | Maim .................... | G06F 21/87 |
| 2013/0159021 A1 * | 6/2013 | Felsher .................. | G16H 10/60 |
| | | | 705/3 |
| 2018/0234433 A1 | 8/2018 | Oberhauser et al. | |
| 2018/0309581 A1 | 10/2018 | Butler et al. | |
| 2020/0278963 A1 * | 9/2020 | Destefanis .......... | H04L 67/1074 |
| 2022/0150072 A1 * | 5/2022 | Jacob .................... | G06F 21/64 |

(Continued)

*Primary Examiner* — Mahfuzur Rahman

(74) *Attorney, Agent, or Firm* — Reinhart Boerner Van Deuren P.C.

(57) ABSTRACT

It is inter-alia disclosed a method performed by at least one apparatus, said method comprising receiving or causing of receiving a connection establishment message from at least one external apparatus or transmitting or causing of transmitting the connection establishment message to the at least one external apparatus; obtaining or causing of obtaining a decentralized identifier representative of the external apparatus based on the connection establishment message; obtaining or causing of obtaining at least one hash value generated based on at least part of the obtained decentralized identifier; storing or causing of storing the at least one hash value in association with at least part of the decentralized identifier in a securitized portion of a memory of a distributed ledger system comprising the peer-to-peer network based on a consensus processing involving at least a subgroup of the nodes of the peer-to-peer network.

20 Claims, 9 Drawing Sheets

(56) References Cited

U.S. PATENT DOCUMENTS

2023/0216947 A1\* 7/2023 Bernardi ................ H04L 63/10
  713/150
2023/0334036 A1\* 10/2023 Covaci ..................... H04L 9/50

\* cited by examiner

DISTRIBUTED LEDGER SYSTEM

CROSS-REFERENCE TO RELATED PATENT APPLICATIONS

This patent application claims priority to European Patent Application No. 20206873.0, filed Nov. 11, 2020, the entire teachings and disclosure of which are incorporated herein by reference thereto.

FIELD OF THE DISCLOSURE

The present disclosure generally relates to distributed ledger technology and in particular to methods, apparatuses and systems enabling interoperability between a distributed ledger system and nodes that may be standalone nodes, that may be part of a further distributed ledger system and/or blockchain system.

BACKGROUND

Blockchain or blockchain like distributed ledger systems have become popular in many fields of applications including technology underlying logistics and/or warehouse processes. For example, blockchain like distributed ledger systems, i.e. distributed ledger systems including at least one or more blockchain mechanisms, such as e.g. a consensus mechanism, may provide a technological basis enabling data communication between entities inside or outside of the distributed ledger system and enabling at the same time a high degree of data security inside of the distributed ledger system.

In particular in order to be able to keep data inside of the distributed ledger system safe, particular interfaces are desirable to enable communication between the distributed ledger system and one or more nodes outside of the distributed ledger system. In particular in the case that one or more outside nodes outside of a distributed ledger system are included in a further distributed ledger and/or blockchain system and/or in a non-distributed ledger and/or non-blockchain system, such particular interface may be desirable to enable interoperability between such outside nodes and nodes of the distributed ledger system.

SUMMARY OF SOME EMBODIMENTS OF THE PRESENT DISCLOSURE

It is inter-alia an object addressed by the present disclosure to provide methods and apparatuses that enable interoperability between a distributed ledger system and at least one node that may be a standalone node or part of a non-distributed ledger system, a distributed ledger system and/or a blockchain system.

According to a first exemplary aspect of the present disclosure, a method performed by at least one apparatus is disclosed, said method comprising:

receiving or causing of receiving a connection establishment message from at least one external apparatus or transmitting or causing of transmitting the connection establishment message to the at least one external apparatus;

obtaining or causing of obtaining a decentralized identifier representative of the external apparatus based on the connection establishment message;

obtaining or causing of obtaining at least one hash value generated based on at least part of the obtained decentralized identifier;

storing or causing of storing at least one hash value in association with at least part of the decentralized identifier in a securitized portion of a memory of a distributed ledger system comprising of the peer-to-peer network based on a consensus processing involving at least a subgroup of the nodes of the peer-to-peer network.

The method according to the first aspect of the present disclosure may be performed by at least one apparatus that is part of or corresponds to at least one node of a peer-to-peer network comprising at least two nodes, wherein a respective one of the nodes of the peer-to-peer network stores at least a portion of a distributed ledger. Thereby, the distributed ledger may incorporate one or more characteristics of a blockchain, e.g. may implement a consensus mechanism for ensuring that data subject to the consensus mechanism is changed only in case of consensus between at least a subgroup nodes of the peer-to-peer network.

In an exemplary embodiment, the distributed ledger comprises data representative of one or more hash values, indices and/or hash indices, a respective hash value, index and/or hash index corresponding to corresponding data, in particular user data or payload data. Thereby, in an exemplary embodiment, the data corresponding to the respective hash value, index and/or hash index is stored locally at a storage device of, connected to and/or accessible by one or more nodes forming at least a subgroup of the nodes of peer-to-peer network. Further, in an exemplary embodiment, the one or more hash values, indices and/or hash indices are held available by the distributed ledger and are subject to a consensus mechanism configured such that a respective hash value, index and/or hash index may be changed or deleted only in case of consensus between at least the subgroup of nodes of the peer-to-peer network.

For the method according to the first aspect of the present disclosure, an apparatus is furthermore disclosed (and subsequently referred to as apparatus according to the first aspect of the present disclosure) that is configured to perform and/or control the respective method or comprises respective means for performing and/or controlling the steps of the respective method. In this case, it is possible either for all the steps of the method to be controlled, or for all the steps of the method to be performed, or for one or more steps to be controlled and one or more steps to be performed. One or more of the means can also be performed and/or controlled by the same unit. By way of example, one or more of the means may be formed by one or more processors.

For the method according to the first aspect of the present disclosure, an apparatus (e.g. the at least one apparatus according to the first aspect) is furthermore disclosed (and subsequently referred to as the at least one apparatus according to the first aspect of the present disclosure) that comprises at least one processor and at least one memory that contains program code, wherein the memory and the program code are configured to use the at least one processor to cause an apparatus (for example the apparatus having the processor and the memory) to perform and/or control at least the respective method. In this case, it is possible either for all the steps of the respective method to be controlled, or for all the steps of the respective method to be performed, or for one or more steps to be controlled and one or more steps to be performed.

The at least one apparatus according to the first aspect of the present disclosure may correspond to or comprise or be comprised by at least one stationary or portable personal computer, at least one server, at least one server system and/or at least one mobile device. Thereby, in an exemplary embodiment, a mobile device corresponds to or comprises a smartphone, a smart watch, a smart band, a tablet computer, a notebook computer, a smart home device, an Internet-of-Things (IoT) device, an Internet-of-Medical-Things (IOMT) device, and/or a data logger. The at least one apparatus according to the first aspect may e.g. be integrated in the back end of a logistics services providing company.

For of the method according to the first aspect of the present disclosure, a system is furthermore disclosed (and subsequently referred to a system according to the first aspect of the present disclosure) that comprises at least one apparatus (e.g. the at least one apparatus according to the first aspect) that is configured to perform and/or control the respective method or has means for performing and/or controlling the steps of the respective method. In this case, it is possible either for all the steps of the respective method to be controlled, or for all the steps of the respective method to be performed, or for one or more steps to be controlled and one or more steps to be performed.

For the method according to the first aspect of the present disclosure, a computer program is furthermore disclosed (and subsequently referred to as computer program according to the first aspect of the present disclosure) that comprises program instructions that cause a processor to perform and/or control the respective method when the computer program runs on the processor. In an exemplary embodiment, such computer program may correspond to, may be part of, or may be incorporated in a source code and/or a device recognizing code. In this specification, a processor is intended to be understood to mean control units, microprocessors, micro control units such as microcontrollers, digital signal processors (DSP), application-specific integrated circuits (ASICs) or field programmable gate arrays (FPGAs), inter alia.

In this case, it is possible either for all the steps of the method (which in an exemplary embodiment may be understood to be conditional steps of the method) to be controlled, or for all the steps of the method to be performed, or for one or more steps to be controlled and one or more steps to be performed. By way of example, the computer program may be distributable via a network such as the internet, a telephone or mobile radio network and/or a local area network, for example. In a non-limiting example, a network may for example correspond to a wireless network, a network employing at least in part a radio-frequency identification (RFID) and/or a Global System for Mobile Communications (GSM) based technology, and/or a network of paring services. The computer program may at least in part be software and/or firmware of a processor. It may equally be implemented at least in part as hardware. By way of example, the computer program may be stored on a computer-readable storage medium, e.g. a magnetic, electric, electromagnetic, optical and/or other kind of storage medium. By way of example, the storage medium may be part of the processor, for example a (nonvolatile or volatile) program memory of the processor or a part thereof. By way of example, the storage medium is substantive, that is to say tangible, and/or non-transitory.

According to a second exemplary aspect of the present disclosure, a distributed ledger system is disclosed, comprising:
- at least two nodes of a peer-to-peer network, wherein a respective one of the nodes of the peer-to-peer network stores at least a portion of a distributed ledger;
- a software development kit and/or an application programming interface configured for enabling communication of a connection establishment message between at least one of the nodes of the peer-to-peer network and an external apparatus;
- a decentralized identifier obtainer configured for obtaining a decentralized identifier representative of the external apparatus based on the connection establishment message;
- a hash value obtainer configured for obtaining at least one hash value generated based on at least part of the obtained decentralized identifier;
- a consensus controller configured for controlling storing of the at least one hash value in association with at least part of the decentralized identifier in a securitized portion of a memory of the distributed ledger system based on a consensus processing involving at least a subgroup of the nodes of the peer-to-peer network.

Exemplary embodiments of all aspects of the present disclosure may have one or more (or for instance all) of the properties described below.

In an exemplary embodiment, the distributed ledger is a collection of digital data that is at least accessible by one or more nodes of the peer-to-peer network, whereby storing of new data as part of the distributed ledger, deletion of existing data and/or amendment of existing data of the distributed ledger is subject to a consensus mechanism between at least a subgroup of the nodes of the peer-to-peer network. The subgroup may for example correspond to a group of nodes that is involved in an application processing in relation to the data to be newly stored, deleted and/or amended. In an exemplary embodiment, a respective node of the peer-to-peer network comprises a storage device and/or is connected to a storage device storing the at least one portion, in an exemplary embodiment a full copy, of the distributed ledger. It is noted that as used herein, the one or more nodes may be understood as corresponding to or comprising at least one node and corresponding supporting hardware and one or more corresponding application services. In an exemplary embodiment, a node may correspond to or be comprised by a data logger, a server, a server or cloud system, an image recognition device, a scanner and/or a Point of Sale (PoS) device.

In an exemplary embodiment, a node of the peer-to-peer network corresponds to or comprises a stationary or a portable personal computer, a servers, a server system and/or a mobile device. Thereby, in an exemplary embodiment, a mobile device corresponds to or comprises a smartphone, a smart watch, a smart band, a tablet computer, a notebook computer, a smart home device, an Internet-of-Things (IoT) device, an Internet-of-Medical-Things (IOMT) device, a data logger, a Point of Sale (PoS) device, a signature and/or face recognition device.

The distributed ledger system may thus correspond to a number of nodes such as a number of computers installed at respective facilities of a company e.g. of a logistics providing company. The distributed ledger may relate to data relating to corresponding applications such as applications relating to a shipment of certain goods. Thereby, data relating to a first application such as a first shipment of goods may be stored at respective storage devices of nodes involved in the first shipment in form of data blocks representing respective stages of the shipment process. For example, a first data block may include data in relation to a shipment request from a client of the logistics provider, a second data block may include data in relation to a confirmation from the logistics provider to the client, a third data block may include data in relation to an initial shipping stage when e.g. the goods are loaded to a shipping vehicle, vessel or plane.

While such data may be stored, e.g. locally on respective storage devices of or connected to nodes involved in the first shipment process, the distributed ledger system is in an exemplary embodiment configured to assign (e.g. comprises an indexer as disclosed further herein configured to assign) at least one respective hash value and/or hash index to a corresponding data block. Thereby, in an exemplary embodiment, a hash value generated for a second data block relating to an application is generated independently of a first data block relating to the application, e.g. representing a stage of the application processing preceding, in particular immediately preceding, a stage of the application processing represented by the second data block. In particular, in an exemplary embodiment, a second data block relating to an application does not comprise a hash value generated for a first data block relating to the application, e.g. representing a stage of the application processing preceding, in particular immediately preceding, a stage or event trigger of the application processing represented by the second data block.

In order to enable that a node of the distributed ledger system may perform application processing (e.g. processing of shipments, transactions, or smart contracts) with one or more nodes outside of the distributed ledger system, a node outside of the distributed ledger system may be onboarded. The corresponding onboarding process may be initiated by the outside node in which case a node of the distributed ledger system may receive a connection establishment message from said node outside of the distributed ledger system which, in an exemplary embodiment, is an example of the at least one external apparatus. The onboarding process may similarly be initiated by a node inside of the distributed ledger system which in this case may transmit the connection establishment message to the at least one external apparatus.

In a next stage of the onboarding process, the node of the distributed ledger system may obtain a decentralized identifier representative of the external apparatus based on the connection establishment message. Thereby, in an exemplary embodiment, the node of the distributed ledger system obtains the decentralized identifier from a (software) module of the distributed ledger system (e.g. from a partner discoverer disclosed further herein) configured for generating the decentralized identifier based on information on the external apparatus included in the connection establishment message or a further message received from the external apparatus. It is noted that a decentralized identifier may be an existing decentralized identifier (e.g. already assigned to the external apparatus) or may be newly assigned to the external apparatus.

Further, in an alternative exemplary embodiment, the node of the distributed ledger system may obtain the decentralized identifier representative of the external apparatus from the external apparatus. To this end, the distributed ledger system and/or the node of the distributed ledger system comprises in an exemplary embodiment a decentralized identifier resolver application programming interface (API) configured for resolving a decentralized identifier associated with and received from the external apparatus, e.g. translates a respective format used for a definition of the decentralized identifier at the side of the external apparatus into a format used for a definition of decentralized identifiers at the side of the distributed ledger system. It is noted that in an exemplary embodiment, the decentralized identifier resolver API may employ or may be based on global internet standards such as a W3C standard and/or may correspond to or be based on a RESTful API. Employing the decentralized identifier resolver API may in particular be useful in case that the external apparatus part of a non-distributed ledger system, e.g. a non-blockchain system, comprising a plurality of nodes that are assigned to respective decentralized identifiers generated for this non-distributed ledger system. For example, this embodiment may be suitably applicable if the external apparatus is part of an SAP HANA system. In such case, in an exemplary embodiment, the distributed ledger system takes the role of a master of service (MoS) in relation to the decentralized identifier obtained from the external apparatus.

In particular being based on the decentralized identifier, data communication between nodes of the distributed ledger system and nodes outside of the distributed ledger system is enabled which may essentially be independent of an underlying technology of the system to which the external apparatus belongs. Data communication may be enabled between nodes of the distributed ledger system and stand-alone node, nodes of a further distributed ledger system, nodes of a blockchain system, nodes of a non-distributed ledger system, and/or nodes of a non-blockchain system.

Based on the obtained decentralized identifier, the node of the distributed ledger system then obtains at least one hash value generated based on at least part of the obtained decentralized identifier. As mentioned, in an exemplary embodiment, the distributed ledger system and/or the node of the distributed ledger system comprises an indexer configured to generate at least one hash value based on at least part of the obtained decentralized identifier. The node of the distributed ledger system may thus obtain the hash value from the indexer implemented at the node of the distributed ledger system or from an indexer implemented at a further node of the distributed ledger system.

The at least one hash value is then stored in association with at least part of the decentralized identifier in a securitized portion of a memory of the distributed ledger system. Thereby, in an exemplary embodiment, the memory corresponds to or comprises respective storage devices of or connected to the nodes of the peer-to-peer network, whereby the storage devices may respectively store at least a portion, in particular a full copy, of the distributed ledger. In an exemplary embodiment, the memory further comprises, a securitized portion, i.e. a portion that is subject to particular security. Thereby, the securitized portion may be provided on a dedicated storage device of or connected to one or more of the nodes of the peer-to-peer network, may be distributed over respective storage devices of or connected to one or more nodes of the peer-to-peer network or may be included in an external storage, e.g. in a cloud-based storage.

In an exemplary embodiment, the securitized portion is configured for providing identity-based access to the securitized portion, e.g. the securitized portion provides access only to identified users. Further, in an exemplary embodiment, the securitized portion is configured for encrypting stored data, e.g. for holding the data in encoded form such that only authorized parties can decode the encoded data to access the original information. While the aspects of the present disclosure are not limited in this respect, in an exemplary embodiment, the securitized portion corresponds to or comprises a Vault, in particular a HashiCorp Vault. In an exemplary embodiment, a vault may correspond to hardware configured for storing data in a securitized manner, e.g. to an on premise vault which may correspond to a hardware device configured to store respective security keys and/or to a cloud based secure key storage vault.

In an exemplary embodiment, in addition or alternative to said identity-based access to the securitized portion further forms of employable access include one or more of:

Access based on node identity, e.g. based on what kind of data the node can send and receive;

Access based on node identity, e.g. based on a role of a Node.

Thereby, in an exemplary embodiment, a role of a node may correspond to a node affiliation (e.g. based on an affiliation with a certain entity such as a person, a group of persons and/or a company), a level of the node in the entity (e.g. whether a node belongs to an entity's supply chain), a role based on a country of the node, an economic sphere of the node, a site of the node (e.g. MEA, EMEA, DXB), a user or user group level (accounting team of a certain city or a single accountant using the service)

In an exemplary embodiment, the decentralized identifier is associated with a decentralized identifier document, Thereby, in an exemplary embodiment, the decentralized identifier corresponds to or comprises a Uniform Resource Locator (URL) that associates a subject identified by the decentralized identifier (e.g. the external apparatus) with the decentralized identifier document. In an exemplary embodiment, the decentralized identifier document holds available information relating to or defining one or more public keys associated with the decentralized identifier, authentication information associated with the decentralized identifier (e.g., one or more authentication and/or verification methods), service endpoints, and/or semantics about the subject that it identifies (e.g. the external apparatus). Service endpoints may enable trusted interactions associated with the subject of the decentralized identifier, e.g. with the external apparatus. Service endpoints may for example correspond any one or more nodes of the peer-to-peer network and/or to the external apparatus and may be identified by their corresponding addresses, e.g. by their MAC addresses, by an International Mobile Equipment Identity (IMEI) e.g. in case of a mobile device such as a smart watch or a handheld device, or by a serial number in case of a data logger. The decentralized identifier document may in an exemplary embodiment further comprise a timestamp, e.g. to be used for audit history, and/or a signature, e.g. for integrity. A decentralized identifier document may in an exemplary embodiment correspond to or comprise metadata associated with the decentralized identifier.

As a result, in an exemplary embodiment, a decentralized identifier is an identifier that is generated at the distributed ledger system and/or at the side of the external apparatus based on attributes of the external apparatus and that is associated with a decentralized identifier document. While a decentralized identifier in accordance with the aspects disclosed herein is not limited in this respect, in an exemplary embodiment, the decentralized identifier comprises or corresponds to a DID as specified by the World Wide Web Consortium, W3C. In addition or alternatively, in an exemplary embodiment, the decentralized identifier corresponds to a digital twin encrypted with security keys assigned for a respective end-point.

Thus, in an exemplary embodiment, the method according to the first aspect further comprises obtaining or causing of obtaining at least one hash value based on at least one respective address of at least one corresponding service endpoint and/or based on at least one corresponding public key included in the decentralized identifier document.

In an exemplary embodiment, the method according to the first aspect further comprises:

assigning or causing of assigning at least one pair of public and private keys to the external apparatus;

providing or causing of providing the public key to the external apparatus; and storing or causing of storing at least the private key in association with at least part of the decentralized identifier in the securitized portion of the memory of the distributed ledger based on a consensus processing involving at least a subgroup of the nodes of the peer-to-peer network.

Thus, the node of the distributed ledger system may comprise a (software) module (e.g. the partner discoverer disclosed further herein) configured to generate a pair of public and private keys to be assigned to the external apparatus. Thereby, in an exemplary embodiment public and private keys correspond to and/or are generated based on asymmetric cryptography. In an exemplary embodiment, the keys are generated based on an Elliptic Curve Digital Signature Algorithm (ECDSA) which may enable use of smaller keys providing a similar level of security as non-elliptic-curve-cryptography based keys. Thereby, in an exemplary embodiment, the keys are generated based on an SECP256K1 and/or an SECP156R1 curve.

In an exemplary embodiment, the method according to the first aspect further comprises:

assigning or causing of assigning at least one partner role to the external apparatus defining access rights and/or read/write permissions of the external apparatus;

storing or causing of storing information setting the at least one partner role in association with at least part of the decentralized identifier in the securitized portion of the memory of the distributed ledger system based on a consensus processing involving at least a subgroup of the nodes of a peer-to-peer network.

Thus, in an exemplary embodiment, upon onboarding of the external apparatus, a partner role is assigned to the external apparatus that defines e.g. write access permission that may be associated with messages transmitted from the external apparatus to distributed ledger system. Thereby, in an exemplary embodiment, an external apparatus may be assigned one or more partner roles for one or more applications processed between the external apparatus and the distributed ledger system.

In an exemplary embodiment, the method according to the first aspect further comprises:

providing or causing of providing the at least one hash value generated based on at least part of the obtained decentralized identifier to the external apparatus, in particular in association with the decentralized identifier.

By communicating the hash value generated based on at least part of the obtained decentralized identifier to the external apparatus, it becomes possible that further data communication between the external apparatus and the node of the distributed ledger system is secured based on a validation of the hash at least at the side of the distributed ledger system for incoming messages from the external apparatus (hash pairing).

In an exemplary embodiment, the method according to the first aspect further comprises:

establishing or causing establishing a digital twin based machine-to-machine pairing between the external apparatus and at least one node of the peer-to-peer network, in particular based on the decentralized identifier.

By establishing a digital twin based machine-to-machine pairing between the external apparatus and at least one node of the peer-to-peer network upon onboarding of the external apparatus (and upon further data communication between the node of the peer-to-peer network and the external apparatus), a further layer of security is established further to the key pairing and hash pairing mechanisms.

In an exemplary embodiment, the method according to the first aspect further comprises:
 obtaining or causing of obtaining a message relating to an application from the external apparatus;
 generating or causing of generating of a message token; and
 providing or causing of providing the message token to the external apparatus in response to the received message relating to the application.

As mentioned, once the external apparatus is onboarded, the external apparatus and the distributed ledger system (one or more nodes thereof) may perform processing such as data communication in relation to respective applications. Thereby, in an exemplary embodiment, applications comprise applications in relation to shipment of goods, transactions in general, and/or smart contracts. Thereby, in an exemplary embodiment, a message relating to an application comprises a request for starting an application processing between the external apparatus and the distributed ledger system, e.g. a request for shipment of goods, a booking request, etc. In an exemplary embodiment, the message relating to an application may further comprise a request for a status of an application processed between the distributed ledger system and the external apparatus.

In an exemplary embodiment, the message token is generated based on information included in the message relating to the application.

The message token is in an exemplary embodiment representative of a status of an application processed between the distributed ledger system and the external apparatus. Thereby, in an exemplary embodiment, the message token may comprise or relate to a digital identity of the application processed between the distributed ledger system and the external apparatus.

In an exemplary embodiment, the message token comprises information based on which the external apparatus is enabled to access status information on the status of an application processed between the external apparatus and the distributed ledger system. For example, the message token may include a link based on which the external apparatus may access an internet address/page holding available said information on the status of the application, which may then for example be displayed to a user of the external apparatus via a display connected to the external apparatus.

In an exemplary embodiment, the message token comprises a Quick Response, QR, code configured for enabling the external apparatus to access status information on a status of an application processed between the external apparatus and a node of the peer-to-peer network. The QR code may for example correspond to a salted QR code, and may in an exemplary embodiment comprise the hash value generated based on at least part of the obtained decentralized identifier. In this way, the QR code may be securely verified to be from the distributed ledger system at the side of the external apparatus to prevent fraud which may be caused if corresponding QR are used by illegal entities.

In an exemplary embodiment, the distributed ledger comprises a collection of hash indices and/or hash values, wherein a respective hash index and/or hash value is associated with a corresponding data block and/or a corresponding portion of a data block stored at a storage device of or connected to one or more nodes of the peer-to-peer network independently of the distributed ledger. As mentioned above, one or more nodes of the peer-to-peer network may comprise or be connected to respective local storage devices for storing data in relation to applications in which the one or more nodes are involved. In order to provide data security, consensus and immutability, hash values generated based on respective data blocks are stored as part of the distributed ledger. Thereby, change, deletion or replacement of a respective hash value and/or hash index stored as part of the distributed ledger is subject to consensus processing involving at least the one or more nodes involved in a respective application processing.

For example, if a shipment process involves three nodes of the distributed ledger system, data in relation to respective stages of the shipment processing may be stored in form of data blocks representing respective stages of the shipment process at respective storage devices of or connected to respective ones of the three nodes involved in the shipment process. Hash values and/or hash indices relating to (e.g. being generated based on) the respective data blocks (and this to respective stages) are stored as part of the distributed ledger such that deletion, replacement and/or change of a respective hash value and/or hash index is subject to a consensus processing between at least the three nodes involved in the shipment process. It is noted that in this case, the consensus processing may be restricted to only the three nodes involved. In this way, on the one hand, flexibility is provided as it is possible to amend data later on, while the required consensus processing provides a sufficient degree of security and immutability.

In an exemplary embodiment, the method according to the first aspect is performed by the distributed ledger system.

Thereby, in an exemplary embodiment, the distributed ledger system comprises an indexer (e.g. a software module) configured to assign a corresponding hash value at least to a portion of a respective data block and/or sub block of the distributed ledger by applying a hashing function based on the data block and/or based on the sub block independently of a different data block and/or a different sub block. Further, in an exemplary embodiment, a respective relation between hash indices and/or hash values associated with a group of data blocks is stored to be accessible and/or manageable by the indexer.

Thus, as opposed e.g. to a traditional blockchain where a data block is interrelated with a preceding data block by including a hash value generated based on the preceding data block, for example a temporal relationship and/or a content related relationship between data blocks stored in relation to the distributed ledger of the distributed ledger system disclosed herein is kept via a separate responsible entity, the indexer, which enables particular flexibility while a sufficient degree of security and immutability is maintained.

In an exemplary embodiment, the external apparatus corresponds to or is included in a mobile device comprising:
 a thin client enabling the mobile device to perform functions of a node of the distributed ledger system.

In other words, in an exemplary embodiment, the mobile device is enabled by the thin client to act as a node of a distributed ledger system and may thus be configured for performing corresponding functions such as in particular hash value generation. Thus, in an exemplary embodiment, the thin client comprises an indexer enabling the mobile device to be configured for generating a hash value based on at least part of a decentralized identifier obtained from a node of the distributed ledger system. While the mobile device is thus enabled to store or cause storing of hash values and/or indices as part of the distributed ledger, the mobile device may be configured for storing corresponding data blocks in relation to an application processed between the mobile device and the distributed ledger system in an external storage such as a cloud storage.

It is to be understood that the presentation of the present disclosure in this section is merely by way of examples and non-limiting.

Other features of the present disclosure will become apparent from the following detailed description considered in conjunction with the accompanying figures. It is to be understood, however, that the figures are designed solely for purposes of illustration and not as a definition of the limits of the present disclosure, for which reference should be made to the appended claims. It should be further understood that the figures are not drawn to scale and that they are merely intended to conceptually illustrate the structures and procedures described herein.

DETAILED DESCRIPTION

The following description serves to deepen the understanding of the present disclosure and shall be understood to complement and be read together with the description of example embodiments of the present disclosure as provided in the above SUMMARY section of this specification.

Figure 1A:
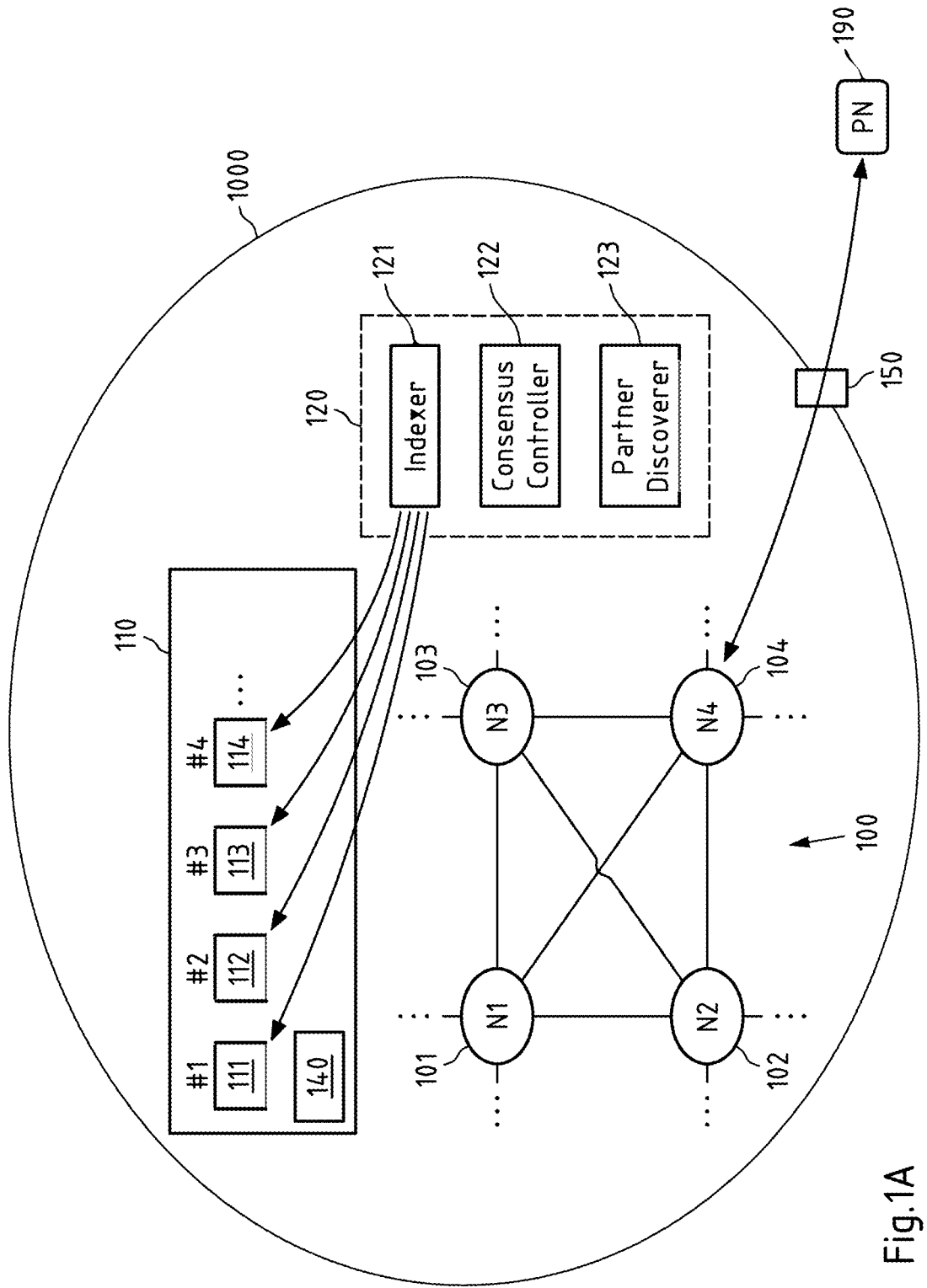
FIG. 1A is a schematic high-level block diagram of a distributed ledger system.

FIG. 1A is a schematic high-level block diagram of a distributed ledger system 1000, e.g. a distributed ledger database system. In accordance with exemplary embodiments disclosed herein, a distributed ledger is a collection of digital data that is accessible by one or more nodes forming or being connected to a peer-to-peer network of nodes such as stationary or portable personal computers, servers, server systems and/or mobile devices. FIG. 1A shows an exemplary peer-to-peer network 100 formed by a first node 101, a second node 102, a third node 103, and a fourth node 104. As indicated by the respective dotted lines, peer-to-peer network 100 is not limited to the nodes exemplarily illustrated in the figure but may include further or fewer nodes.

In an exemplary embodiment, the distributed ledger is stored on a memory 110 at least parts of which may be distributed among some or all of the nodes of peer-to-peer network 100. Thereby, at least respective portions of the distributed ledger may be stored redundantly on several or all of the nodes of peer-to-peer network 100. In other words, in an exemplary embodiment, a respective node of peer-to-peer network 100 is configured to store at least one portion, in particular a full copy, of the distributed ledger. To this end, in an exemplary embodiment, a respective node of peer-to-peer network 100 comprises a storage device and/or is connected to a storage device comprising at least part of memory 110 for storing said at least one portion of the distributed ledger. In an exemplary embodiment, the distributed ledger comprises data representative of one or more hash values, indices and/or hash indices, a respective hash value, index and/or hash index corresponding to corresponding data, in particular user data or payload data. Thereby, in an exemplary embodiment, the data corresponding to the respective hash value, index and/or hash index is stored locally at a storage device of one or more nodes forming a subgroup of the nodes of peer-to-peer network 100.

As exemplarily illustrated in FIG. 1A, the distributed ledger is stored comprising a plurality of data blocks 111, 112, 113, 114. As indicated by the dotted line in FIG. 1A, it is to be noted that a number of data blocks of the distributed ledger is not limited to four as exemplarily illustrated but may be smaller or larger than four. Thereby, as shown in FIG. 1A, a respective hash value identified by a corresponding hash index #1, #2, #3, #4 is assigned to a corresponding one of data blocks 111, 112, 113, 114. To this end, in an exemplary embodiment, the distributed ledger system 1000 comprises an indexer 121 configured to assign a corresponding hash value at least to a portion of a respective data block of the distributed ledger. It is noted that more than one hash value may be assigned to a data block. For example, a data block may be separated into two or more sub blocks and a respective hash value may be assigned to a corresponding sub block. In an exemplary embodiment, indexer 121 is configured to assign a hash value to a respective data block and/or to a sub block by applying a hashing function based on the data block and/or based on the sub block. For example, indexer 121 may apply the hashing function based on and/or using data included in the data block and/or the sub block. In an exemplary embodiment, indexer 121 corresponds to a software module and/or function implemented as executable code configured for controlling the function of the indexer 121. In an exemplary embodiment, the indexer 121 is implemented at one or more nodes of the peer-to-peer network 100. Further, in an exemplary embodiment, indexer 121 is configured to assign a hash value to a respective data block and/or to a sub block by applying a hashing function based on the data block and/or based on the sub block and independently of a data block and/or sub block generated before or after the respective data block and/or sub block. Thereby, in an exemplary embodiment, a respective relation between indices associated with a group of data blocks, e.g. a group of data blocks pertaining to a same application, is kept stored to be accessible and manageable by the indexer 121. Thus, as opposed to a conventional blockchain, the distributed ledger system 1000 provides dependency between respective groups of data blocks via indexer 121. Thereby, the distributed ledger system 1000 is provided with an enhanced degree of flexibility, as data blocks and/or respective sub blocks may be amended, deleted or replaced, while respective relations between the data blocks and/or respective sub blocks is kept at the indexer 121. Further, while deletion, replacement and/or amendment of data blocks may thus be possible, such deletion, replacement and/or amendment is in an exemplary embodiment subject to the consensus mechanism based on consensus controller 122 such that a degree of safety comparable to a degree of safety provided by traditional blockchain technology is provided similarly by distributed ledger system 1000.

As further shown in FIG. 1A, the distributed ledger system 1000 further comprises in an exemplary embodiment a partner discoverer 123, in an exemplary embodiment a software module and/or function implemented as executable code configured for holding available partner information of one or more partner nodes, whereby a partner node may be one of the of the nodes of the peer-to-peer network 100 or a node not part of the distributed ledger system 1000. In an exemplary embodiment, partner discoverer 123 corresponds to a software module and/or function implemented as executable code configured for controlling the function of the partner discoverer 123. In an exemplary embodiment, the partner discoverer 123 is implemented at one or more nodes of the peer-to-peer network 100. In an exemplary embodiment, partner discoverer 123 is an application programming interface (API) based (software) module that is configured for maintaining (e.g. storing) a registry comprising information relating to one or more partner nodes and/or information relating to one or more applications relating to one or more nodes of the peer-to-peer network and/or to one or more partner nodes. In an exemplary embodiment, partner discoverer 123 is a (software) module that is configured for generating a decentralized identifier representative of (e.g. identifying a) partner node based on corresponding information relating to the partner node received from one or more of the nodes of the peer-to-peer network 100 and/or received from the partner node, e.g. from a dedicated interface. For example, FIG. 1A shows partner node 190 that communicates with node 104 of peer-to-peer network 100 via dedicated interface 150. In an exemplary embodiment, dedicated interface 150 comprises a software development kit (SDK) 151 and/or an application programming interface (API) 152. It is noted that the partner discoverer 123 may thus correspond to an exemplary embodiment of the decentralized identifier obtainer. In an exemplary embodiment, the partner discoverer 123 is further configured for generating a pair of public and private keys to be assigned to partner node 190 and/or for assigning and/or holding available information setting and/or defining a partner role of the partner node, the partner role defining access rights and/or read/write permissions of the partner node.

In an exemplary embodiment, the distributed ledger system 1000 further comprises one or more further software modules and/or functions implemented as executable code configured for controlling respective functions and/or operations of a blockchain. In particular, in an exemplary embodiment, the distributed ledger system 1000 further comprises a consensus controller 122, in an exemplary embodiment, a software module and/or function implemented as executable code configured for implementing a consensus mechanism in particular for ensuring that a new data block is added to the distributed ledger and/or that an existing data block is altered and/or removed from the distributed ledger only in case of consensus between at least some or between all nodes of the peer-to-peer network 100. Further, in an exemplary embodiment, the consensus controller 122 is configured to control storing of at least one hash value in association with at least part of a decentralized identifier in a securitized portion 140 of a memory 110 of the distributed ledger system 1000 based on a consensus processing involving at least a subgroup of the nodes of the peer-to-peer network. In an exemplary embodiment, the consensus controller 122 is implemented at one or more nodes of the peer-to-peer network 100.

As exemplarily illustrated in FIG. 1A, in an exemplary embodiment, indexer 121, consensus controller 122 and partner discoverer 123 are implemented as respective modules of a controller 120 which in an exemplary embodiment corresponds to a software module and/or function implemented as executable code configured for controlling at least the functions of indexer 121, consensus controller 122 and of partner discoverer 123, the controller 120 being implemented at one or more nodes of the peer-to-peer network 100.

Figure 1B:
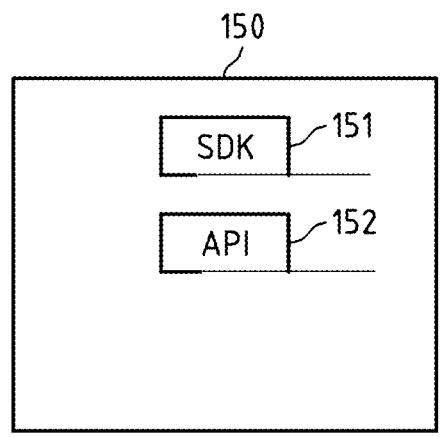
FIG. 1B is a schematic high-level block diagram of a dedicated interface.
Figure 1C:
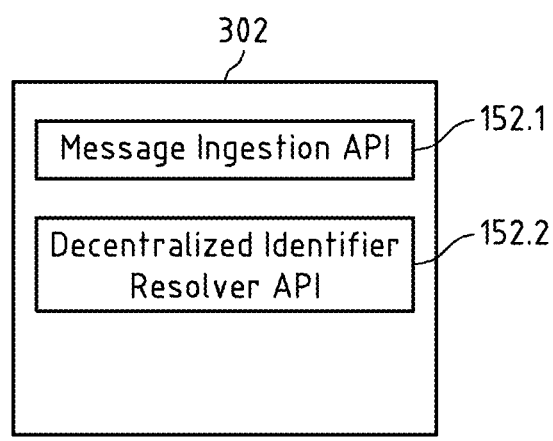
FIG. 1C is a schematic high-level block diagram of an application programming interface.

Referring back to memory 110, in an exemplary embodiment, the data blocks 111, 112, 113, 114 may represent in particular a transaction, a shipment, and/or a smart contract. Thereby, in an exemplary embodiment, a respective data block represents a stage of the transaction, of the shipment and/or of the smart contract. A respective data block may be generated as a result of communication between one or more of the nodes of the peer-to-peer network 100 and a partner node. A respective data block may for example be generated for example based on communication between partner node 190 shown in FIG. 1A and node 104 of the peer-to-peer network 100 via the dedicated interface 150. As illustrated in FIG. 1B, the dedicated interface 150 comprises in an exemplary embodiment a software development kit (SDK) 151 and/or application programming interface (API) 152. In an exemplary embodiment, API 152 comprises one or more content addressable APIs. In other words API 152 may comprise or correspond to a plurality of respective APIs provided for respective functions. For example, as shown in FIG. 1C, in an exemplary embodiment, the distributed ledger system 1000 comprises a message ingestion API 152.1 implemented as part of API 152. In an exemplary embodiment, message ingestion API 152.1 is configured for responding to an incoming message from partner node 190 e.g. related to an application processed between partner node 190 and distributed ledger system 1000 with an interaction identifier (e.g. a message token) that can be used by partner node 190 to query status and details of processing related to said application.

As further shown in FIG. 1C, in an exemplary embodiment, the distributed ledger system 1000 comprises a decentralized identifier resolver API 152.2 implemented as part of API 152. In an exemplary embodiment, decentralized identifier resolver API 152.2 is configured for resolving a decentralized identifier associated with and received from partner node 190. The decentralized identifier resolver API 152.2 is in particular useful in case the partner node 190 is part of a non-distributed ledger system, e.g. a non-blockchain system, comprising a plurality of nodes that are assigned to respective decentralized identifiers generated for this non-distributed ledger system. In such case, the distributed ledger system 1000 may take over the role of a master of service (MoS) in relation to the decentralized identifier.

Figure 2:
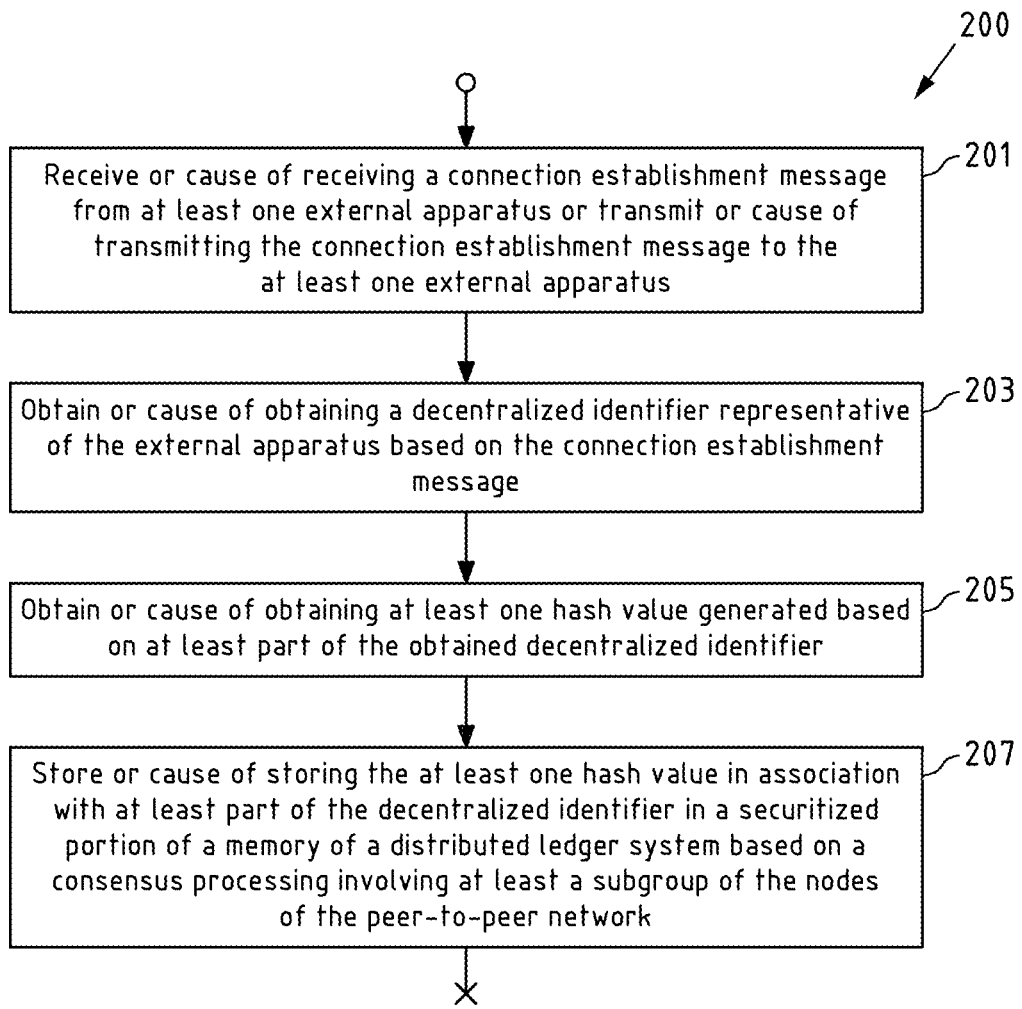
FIG. 2 is an exemplary flow chart illustrating an exemplary embodiment according to the first aspect of the present disclosure.

A partner node 190 may communicate with any one or more of the nodes of the peer-to-peer network 100 after an onboarding process has been performed between the distributed ledger system 1000 and the partner node 190. FIG. 2 is an exemplary flow chart 200 illustrating an exemplary embodiment according to the first aspect of the present disclosure. Flow chart 200 may be understood as illustrating an exemplary onboarding process onboarding partner node

190. Without limiting the scope of the invention, it is assumed in the following that node 104 of peer-to-peer network 100 as disclosed above with respect to FIG. 1A performs the steps of flow chart 200 in communication with partner node 190 (an example of the external apparatus) as disclosed above with respect to FIG. 1A. It is noted that the steps of flow chart 200 could likewise be performed by any one or more of the nodes of the peer-to-peer network 100. Thereby, node 104 and/or a corresponding processor thereof may correspond to an example of the at least one apparatus in accordance with the first aspect disclosed herein. Further, the method of flowchart 200 may be performed by distributed ledger system 1000, e.g. by one or more nodes of peer-to-peer network 100 and/or any one of the modules of distributed ledger system 1000 disclosed herein.

In a step 201, node 104 receives (and/or e.g. said processor of node 104 causes node 104 to receive) a connection establishment message from partner node 190 (an example of the at least one external apparatus). Alternatively, node 104 may transmit (and/or e.g. said processor of node 104 causes node 104 to transmit) the connection establishment message to partner node 190.

For example, in an exemplary embodiment, the distributed ledger system 1000 is configured for (i.e. comprises a software module and/or function implemented as executable code at one or more of the nodes of peer-to-peer network 100 and configured for controlling) providing at least one Software Development Kit (SDK), e.g. SDK 151 exemplarily illustrated in FIG. 1B, to partner node 190 that enables partner node 190 to perform various operations in communication with the distributed ledger system 1000. Based on the SDK 151, partner node 190 and/or the distributed ledger system 1000 are in an exemplary embodiment enabled to manage a plurality of interactions between the distributed ledger system 1000 and the partner node 190. For example, the partner node 190 may send a request for creating a decentralized identifier to node 104 using SDK 151. Further, SDK 151 may comprise one or more libraries related to the decentralized identifier enabling the SDK 151 to perform authentication functions or interactions with the distributed ledger system 1000 based on the decentralized identifier.

Referring back to FIG. 2, in a step 203, node 104 obtains the decentralized identifier representative of the partner node 190 based on the connection establishment message. Thereby, in an exemplary embodiment, the decentralized identifier is generated at the distributed ledger system 1000, in an exemplary embodiment by partner discoverer 123. Alternatively or in addition, the decentralized identifier may be obtained by receiving the decentralized identifier from partner node 190. The latter case may apply for example in case partner node 190 is itself a node of a non-distributed ledger system, e.g. a non-blockchain network, that comprises nodes configured for mutual communication based on decentralized identifiers. An example of such system may for example correspond to an SAP HANA system. In such case, the distributed ledger system may take over the role of a master of service (MoS).

As opposed to traditional identifiers and/or identities that are usually defined in relation to centralized registries, identity providers, and certificate authorities, in an exemplary embodiment, a decentralized identifier is generated by a corresponding controller, e.g. in case of the distributed ledger system 1000 by partner discoverer 123, that defines what the decentralized identifier identifies. As mentioned, while the decentralized identifier may be received via interface 150 from partner node 190, the decentralized identifier identifying partner node 190 may be received from partner node 190. In such case, e.g. a distributed ledger system to which partner node 190 belongs may comprise a controller that has generated the decentralized identifier.

In an exemplary embodiment, the decentralized identifier (generated by partner discoverer 123 or received via interface 150) is defined in association with a decentralized identifier document. Thereby, in an exemplary embodiment, the decentralized identifier corresponds to or comprises a Uniform Resource Locator (URL) that associates a subject identified by the decentralized identifier (e.g. partner node 190) with the decentralized identifier document. In an exemplary embodiment, the decentralized identifier document holds available information relating to or defining one or more public keys associated with the decentralized identifier, authentication information associated with the decentralized identifier (e.g., one or more authentication and/or verification methods), service endpoints, and/or semantics about the subject that it identifies (e.g. partner node 190). Service endpoints may enable trusted interactions associated with the subject of the decentralized identifier, e.g. with the partner node 190. Service endpoints may for example correspond any one or more nodes of the peer-to-peer network 100 and/or to the partner node 190 and may be identified by their corresponding addresses, e.g. by their MAC addresses. It is noted that in an exemplary embodiment, one or more security keys held available by the decentralized identifier key are generated based on or in form of a salt, whereby a salt may be understood e.g. as corresponding to random data used as additional input to a function employed for creating a respective security key and/or hash value. The decentralized identifier document may in an exemplary embodiment further comprise a timestamp, e.g. to be used for audit history, and/or a signature, e.g. for integrity. A decentralized identifier document may in an exemplary embodiment correspond to or comprise metadata associated with the decentralized identifier e.g. stored at memory 110.

As a result, in an exemplary embodiment, a decentralized identifier is an identifier that is generated at the distributed ledger system 1000 and/or at the side of the partner node 190 based on attributes of the partner node 190 (public keys provided to the partner node 190 for accessing data held at the distributed ledger system 1000, service endpoints for partner node 190 and/or an application to be executed by partner node 190 with distributed ledger system 1000, and/or semantics about partner node 190) and that is associated with a decentralized identifier document. While a decentralized identifier in accordance with the aspects disclosed herein is not limited in this respect, in an exemplary embodiment, the decentralized identifier comprises or corresponds to a DID as specified by the World Wide Web Consortium, W3C.

As mentioned, API 152 comprises the decentralized identifier resolver API 152.2 shown in FIG. 1C that is configured for resolving a decentralized identifier associated with and received from partner node 190. In particular in case that the partner node 190 is part of a further distributed ledger system, e.g. a blockchain system, the decentralized identifier may relate to a decentralized identifier scheme defined at the further distributed ledger system. In such case, the decentralized identifier resolver API 152.2 is configured for resolving a decentralized identifier received from partner node 190. In particular, in an exemplary embodiment, the decentralized identifier resolver API 152.2 is configured for resolving decentralized identifiers received from a Hyperledger Fabric blockchain platform, from a Corda DLT, from a MultiChain blockchain and/or from a Quorum Blockchain platform.

Referring back to FIG. 2, in a step 205, node 104 obtains at least one hash value generated based on at least part of the decentralized identifier obtained in step 203. For example, in an exemplary embodiment, indexer 121 of distributed ledger system 1000 is configured to generate a hash value based on at least part of the decentralized identifier obtained in step 203, e.g. by applying a hashing function to the at least part of the decentralized identifier. The indexer 121 may thus correspond to an exemplary embodiment of the hash value obtainer. The hash value may be obtained in particular based on any part of the decentralized identifier referred to in the decentralized identifier document. In particular, in an exemplary embodiment, node 104 obtains at least one hash value generated based on respective addresses (e.g. MAC addresses) of one or more service endpoints and/or one or more public keys included in a decentralized identifier document associated with the decentralized identifier. Thereby, in an exemplary embodiment, the service endpoints comprise at least one of an address (e.g. a MAC address) of node 104 and an address (e.g. a MAC address) of partner node 190. In particular, in an exemplary embodiment, indexer 121 of distributed ledger system 1000 is configured to generate the hash value based on one or more service endpoints and/or one or more public keys included in the decentralized identifier document associated with the decentralized identifier. As mentioned, the indexer 121 (which may also be referred to as hash generator of distributed ledger system 1000) may be implemented as a software module of any one or more of the nodes of peer-to-peer network 100. Thus, node 104 may obtain the at least one hash value either directly in case the indexer 121 is implemented at node 104 and/or indirectly in case the indexer 121 is implemented at any one or more further nodes of the peer-to-peer network 100. In the latter case, the at least one hash value may be stored in a portion of memory 110 shared by node 104 with the one or more further nodes of the peer-to-peer network 100 such that it is accessible (and thus obtained) by node 104.

In other words, as further illustrated in FIG. 2, in a step 207, node 104 may store or may cause any one or more of the nodes of the peer-to-peer network 100 to store the at least one hash value in association with at least part of the decentralized identifier in a securitized portion 140 of memory 110 of the distributed ledger system 1000, in an exemplary embodiment in association with at least part of and/or the decentralized identifier document of the decentralized identifier, based on a consensus processing involving at least a subgroup of the nodes of the peer-to-peer network 100. It is noted that in step 207, both the hash value as well as the decentralized identifier may be stored in association in the securitized portion 140. In an exemplary embodiment, the consensus processing may further involve partner node 190.

For example, a consensus processing implemented in form of consensus controller 122 at one or more or all of the nodes of peer-to-peer network 100 and/or at node 190 may be initiated, e.g. by node 104 based on communication with partner node 190, to obtain consensus among nodes participating at the consensus processing that the at least one hash value may be stored at the securitized portion 140 of memory 110. Thereby, in an exemplary embodiment the consensus processing may be restricted to a subgroup of the nodes of the peer-to-peer network 100. The consensus processing is in an exemplary embodiment restricted to the subgroup of the nodes of the peer-to-peer network 100 and the partner node 190. The subgroup of nodes of the peer-to-peer network 100 may for example correspond to a group of nodes (e.g. nodes 101, 102, 103 and 104 shown in FIG. 1A) that are involved in an application processing with the partner node 190 for which the onboarding process is performed with partner node 190.

In an exemplary embodiment, the securitized portion 140 of memory 110 corresponds to a dedicated portion of the memory corresponding to or comprising respective dedicated storage spaces provided at and/or connected to one, more or all of the nodes of the peer-to-peer network 100 and/or to a cloud storage connected to and/or accessible by one, more or all of the nodes of the peer-to-peer network 100. In an exemplary embodiment, the securitized portion 140 of memory 110 is configured for providing identity-based access to the securitized portion 140, e.g. the securitized portion 140 provides access only to identified users. Further, in an exemplary embodiment, the securitized portion 140 of memory 110 is configured for encrypting stored data, e.g. for holding the data in encoded form such that only authorized parties can decode the encoded data to access the original information. While the aspects of the present disclosure are not limited in this respect, in an exemplary embodiment, the securitized portion 140 of memory 110 corresponds to or comprises a Vault, in particular a particular Vault assigned to the distributed ledger, a HashiCorp Vault, an on premise vault and/or a cloud based secure key storage vault.

Further, in an exemplary embodiment, node 104 is configured to provide the at least one hash value generated based on at least part of the obtained decentralized identifier to partner node 190 in particular in association with the decentralized identifier. As disclosed further herein, the at least one hash value, which may in particular comprise a hash value generated based on endpoint information (e.g. a MAC address) of partner node 190 may enable an additional means to verify identity of partner node 190 upon communication with partner node 190 after onboarding of partner node 190 and may thus provide an additional level of security.

It is noted that in an exemplary embodiment SDK 151 provided to partner node 190 may enable partner node 190 and the distributed ledger system 1000 to establish a digital twin based machine-to-machine pairing in an exemplary embodiment further based on the decentralized identifier. For example, the so established machine pairing may enable provision of a digital twin of at least part of distributed ledger system 1000, in particular of one or more nodes of the peer-to-peer network 100, e.g. of node 104, to partner node 190.

Figure 3:
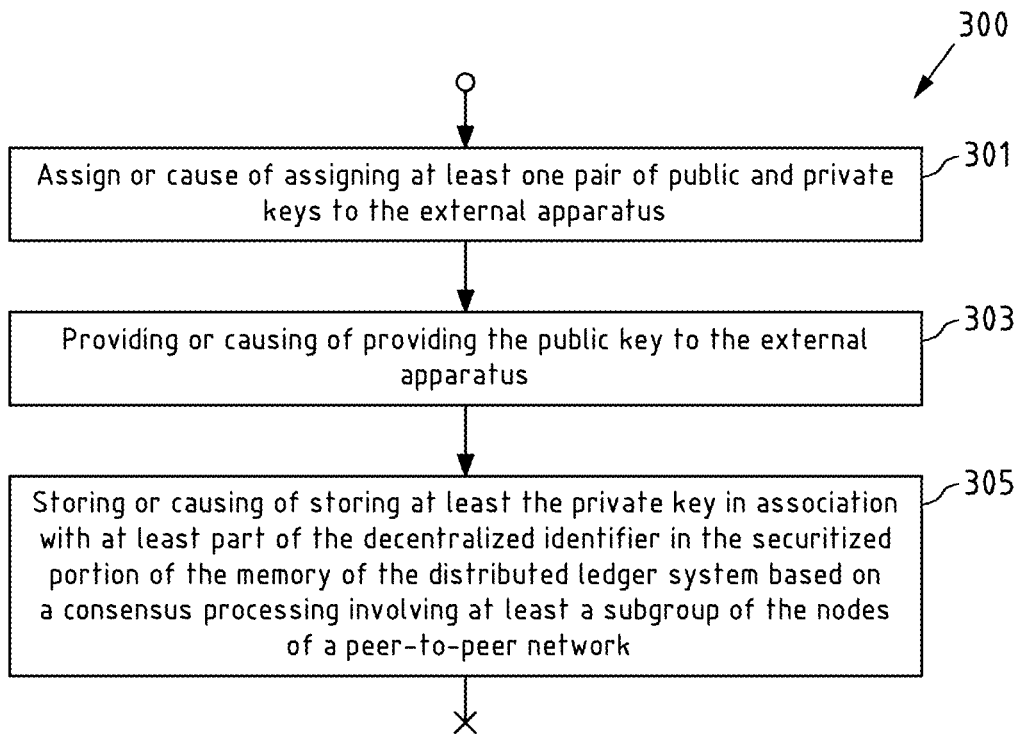
FIG. 3 is an exemplary flow chart illustrating an exemplary embodiment of steps of a method that may be performed as part of the method of FIG. 2.

FIG. 3 is an exemplary flow chart 300 illustrating an exemplary embodiment of steps of a method that may be performed as part of the method of flow chart 200 illustrated with reference to FIG. 2. Without limiting the scope of the invention, it is assumed in the following that node 104 of peer-to-peer network 100 as disclosed above with respect to FIG. 1A performs the steps of flow chart 300 in communication with partner node 190 (an example of the external apparatus) as disclosed above with respect to FIG. 1A. It is noted that the steps of flow chart 300 could likewise be performed by any one or more of the nodes of the peer-to-peer network 100. Thereby, node 104 and/or a corresponding processor thereof may correspond to an example of the at least one apparatus in accordance with the first aspect disclosed herein. Further, the method of flowchart 300 may be performed by distributed ledger system 1000, e.g. by one or more nodes of peer-to-peer network 100 and/or any one of the modules of distributed ledger system 1000 disclosed herein.

As shown, in a step 301, at least one pair of public and private keys is assigned to the partner node 190. To this end, for example, the partner discoverer 123 may generate a pair of public and private keys to be assigned to partner node 190, wherein public and private keys as referred to herein correspond to and/or are generated based on asymmetric cryptography. In an exemplary embodiment, the keys are generated based on an Elliptic Curve Digital Signature Algorithm (ECDSA) which may enable use of smaller keys providing a similar level of security as non-elliptic-curve-cryptography based keys. Thereby, in an exemplary embodiment, the keys are generated based on an SECP256K1 and/or an SECP156R1 curve. It is noted that in an exemplary embodiment, step 301 is performed as a step of a method in accordance with flowchart 200 and may be performed before, after or in conjunction with step 203.

Further, in a step 303, node 104 provides the public key to the partner node 190 and in a step 305, at least the private key is stored in association with at least part of the decentralized identifier in the securitized portion 140 of the memory 101 of the distributed ledger system 1000 based on a consensus processing involving at least a subgroup of the nodes of a peer-to-peer network 100. Hereby, storing of at least the private key may be performed based on the consensus processing as described in case of step 207 for storing the at least one hash value. In an exemplary embodiment, in addition to the private key, also the public key is stored in the securitized portion 140 of the memory 101 of the distributed ledger system 1000. In particular, in an exemplary embodiment, the private key and/or the public key is added to the decentralized identifier document assigned to the decentralized identifier stored in the securitized portion 140.

Figure 4:
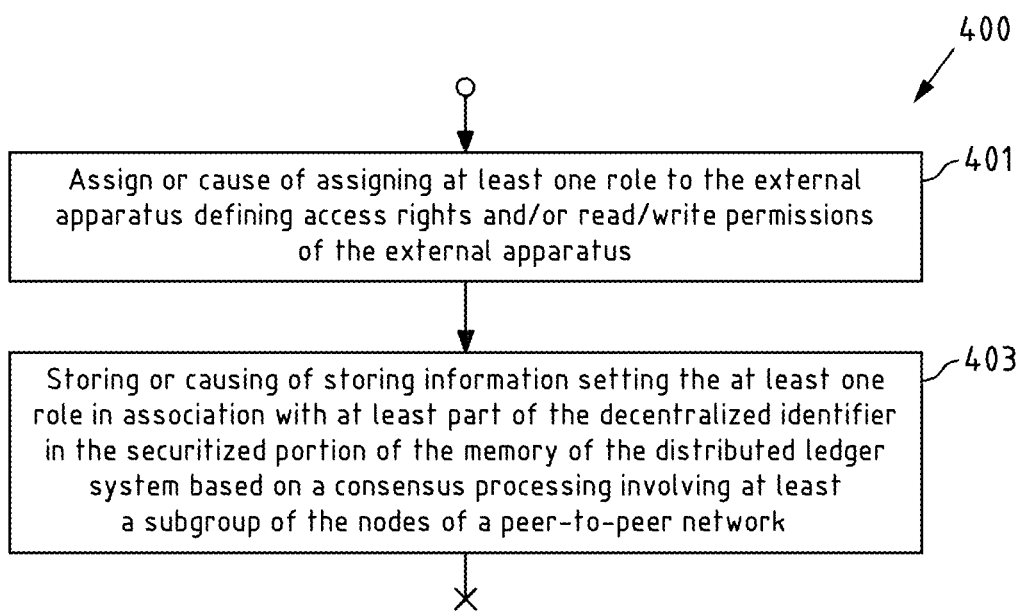
FIG. 4 is an exemplary flow chart illustrating an exemplary embodiment of steps of a method that may be performed as part of the method of FIG. 2 and/or the method of FIG. 3.

FIG. 4 is an exemplary flow chart 400 illustrating an exemplary embodiment of steps of a method that may be performed as part of the method of flow chart 200 illustrated with reference to FIG. 2 and/or of flow chart 300 illustrated with reference to FIG. 3. Without limiting the scope of the invention, it is assumed in the following that node 104 of peer-to-peer network 100 as disclosed above with respect to FIG. 1A performs the steps of flow chart 400 in communication with partner node 190 (an example of the external apparatus) as disclosed above with respect to FIG. 1A. It is noted that the steps of flow chart 400 could likewise be performed by any one or more of the nodes of the peer-to-peer network 100. Thereby, node 104 and/or a corresponding processor thereof may correspond to an example of the at least one apparatus in accordance with the first aspect disclosed herein. Further, the method of flowchart 400 may be performed by distributed ledger system 1000, e.g. by one or more nodes of peer-to-peer network 100 and/or any one of the modules of distributed ledger system 1000 disclosed herein.

As shown, in a step 401, at least one partner role is assigned to partner node 190 defining access rights and/or read/write permissions of partner node 190. Thus, in this exemplary embodiment, upon onboarding of partner node 190, a partner role is assigned to partner node 190 that defines e.g. write access permission that may be associated with messages transmitted from partner node 190 to distributed ledger system 1000. It is noted that a partner node 190 may have one or more partner roles that may be set for one or more applications processed between partner node 190 and distributed ledger system 1000.

In a step 403 information setting (e.g. data corresponding to) the at least one partner role is stored in association with at least part of the decentralized identifier in the securitized portion 140 of the memory 110 of the distributed ledger system 1000 based on a consensus processing involving at least a subgroup of the nodes of a peer-to-peer network 100. Storing of the information setting the at least one partner role may be performed based on the consensus processing as described in case of step 207 for storing the at least one hash value. In particular, in an exemplary embodiment, the information setting (e.g. data corresponding to) the at least one partner role is added to the decentralized identifier document assigned to the decentralized identifier stored in the securitized portion 140.

Thus, the onboarding process performed between the distributed ledger system 1000 and the partner node 190 involves in an exemplary embodiment one or more of providing SDK 151 to the partner node 190, obtaining of at least one decentralized identifier for the partner node 190 at the distributed ledger system 1000, obtaining at least one pair of private and public key for encryption of communication between the distributed ledger system 1000 and storing at least the private key in a securitized portion 140 of memory 110 of the distributed ledger system 1000 in association with the decentralized identifier, and assigning a partner role to the partner node 190.

It is noted that by storing the at least one hash value in association with at least part of the decentralized identifier, the private and/or the public key and/or the information setting the (e.g. on the) partner role assigned to partner node 190 in the securitized portion 140 of memory 110 of the distributed ledger system 1000, this information is in an exemplary embodiment made available as partner information to partner discoverer 123. Thus, after onboarding of a partner node, such partner information is available to all nodes of the peer-to-peer network 100 or at least to a subgroup of the nodes of the peer-to-peer network 100 and can be referred to in further communication with partner node 190. Thereby, particular security is enabled for corresponding communication even if in such case nodes of distributed ledger system 1000 communicate with entities outside of the distributed ledger system. Being based on the decentralized identifier, securitization of communication is thus enabled for communication between partner nodes of the peer-to-peer network 100 and entities outside of the distributed ledger system independently of whether or not such partner nodes are themselves part of a distributed ledger system, a blockchain system, or are entities independent of such system.

Figure 5:
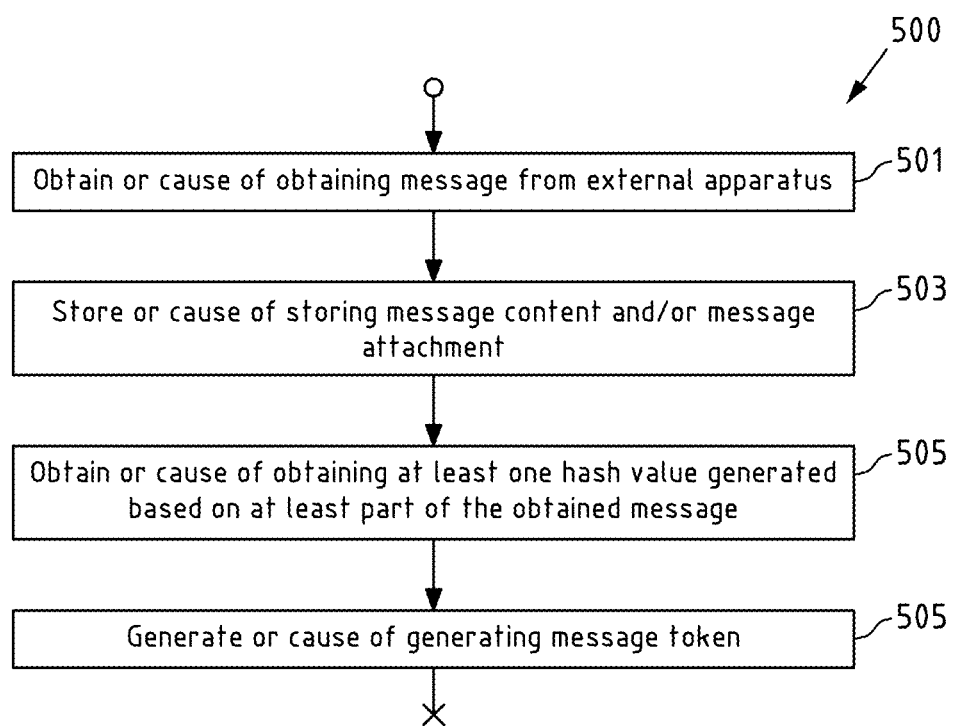
FIG. 5 is an exemplary flow chart illustrating an exemplary embodiment of a message ingestion process.

FIG. 5 is an exemplary flow chart 500 illustrating an exemplary embodiment of a message ingestion process by means of which distributed ledger system 1000 may consume messages from partner nodes, e.g. from partner node 190. Without limiting the scope of the invention, it is assumed in the following that node 104 of peer-to-peer network 100 as disclosed above with respect to FIG. 1A performs the steps of flow chart 500 using message ingestion API 152.1 (which may be implemented at node 104 and/or at any one or more of nodes 102, 103, 104 of the peer-to-peer communication network) in communication with partner node 190 (an example of the external apparatus) as disclosed above with respect to FIG. 1A. It is noted that the steps of flow chart 500 could likewise be performed by any one or more of the nodes of the peer-to-peer network 100. Further, the method of flowchart 500 may be performed by distributed ledger system 1000, e.g. by one or more nodes of peer-to-peer network 100 and/or any one of the modules of distributed ledger system 1000 disclosed herein. It is noted that the method of flowchart 500 may be performed after an onboarding process in accordance with the method of FIG. 2 has been performed.

As shown in FIG. 5, in a step 501 node 104 obtains (or a processor of node 104 causes node 104 of obtaining) a message relating to an application from partner node 190 (an example of the external apparatus). Such message may in an exemplary embodiment correspond for example to a message in which a customer of an owner of at least part of the distributed ledger system 1000 informs the owner about an order, e.g. ordering a shipment of goods. It is noted that in an exemplary embodiment, partner node 190 may be configured for using a HTTPS (Hypertext Transfer Protocol Secure) protocol for sending the message to node 104 of the peer-to-peer network 100.

In a step 503, message ingestion API 152.1 causes storing of message content(s) and/or message attachment(s). To this end, message ingestion API 152.1 may cause storing of message content(s) and/or message attachment(s) in a local storage e.g. of node 104, i.e. independent of memory 110. Alternatively or in addition, message ingestion API 152.1 may cause storing of message content(s) and/or message attachment(s) in a part of memory 110 based on the consensus processing, e.g. involving consensus controller 122.

In a step 504, message ingestion API 152.1 causes generating at least one hash value based on the message content and/or at least one hash value based on the message attachment, e.g. based on communication with indexer 121. As part of step 504, message ingestion API 152.1 may further cause storing of the hash value(s) generated in step 504 in a part of memory 110 based on the consensus processing, e.g. involving consensus controller 122.

In a step 507, message ingestion API 152.1 generates or causes generation of a message token and in a step 508, message ingestion API 152.1 provides or causes of providing the message token to partner node 190 (an example of the external apparatus) in response to the message received in step 501. For example, in an exemplary embodiment, the message token comprises information based on which partner node 190 may access status information on a status of an application processed between partner node 190 and node 104 of the peer-to-peer network 100. For example, the message token may include a link based on which partner node 190 may access an internet address/page holding available said information on the status of the application. Further, in an exemplary embodiment, the message token comprises a Quick Response (QR) code, in particular a salted QR code, configured for enabling the partner node 190 to access the status information. The partner node 190 may for example similarly access an internet address/page by referring to the QR code, the internet address/page holding available the status information to be accessed by the partner node 190. The QR code may further include a hash value generated based on the decentralized identifier of partner node 190 and/or based on the decentralized identifier of node 104 which may enable the QR code to be verified by partner node 190. Based thereon, the status information may for example be displayed to a user of the partner node 190 via a display of and/or connected to the partner node 190.

In a step 509, message ingestion API 152.1 provides the message received in step 501 to a pre-processor which in an exemplary embodiment is implemented at one or more nodes of the peer-to-peer network, in particular at node 104.

Figure 6:
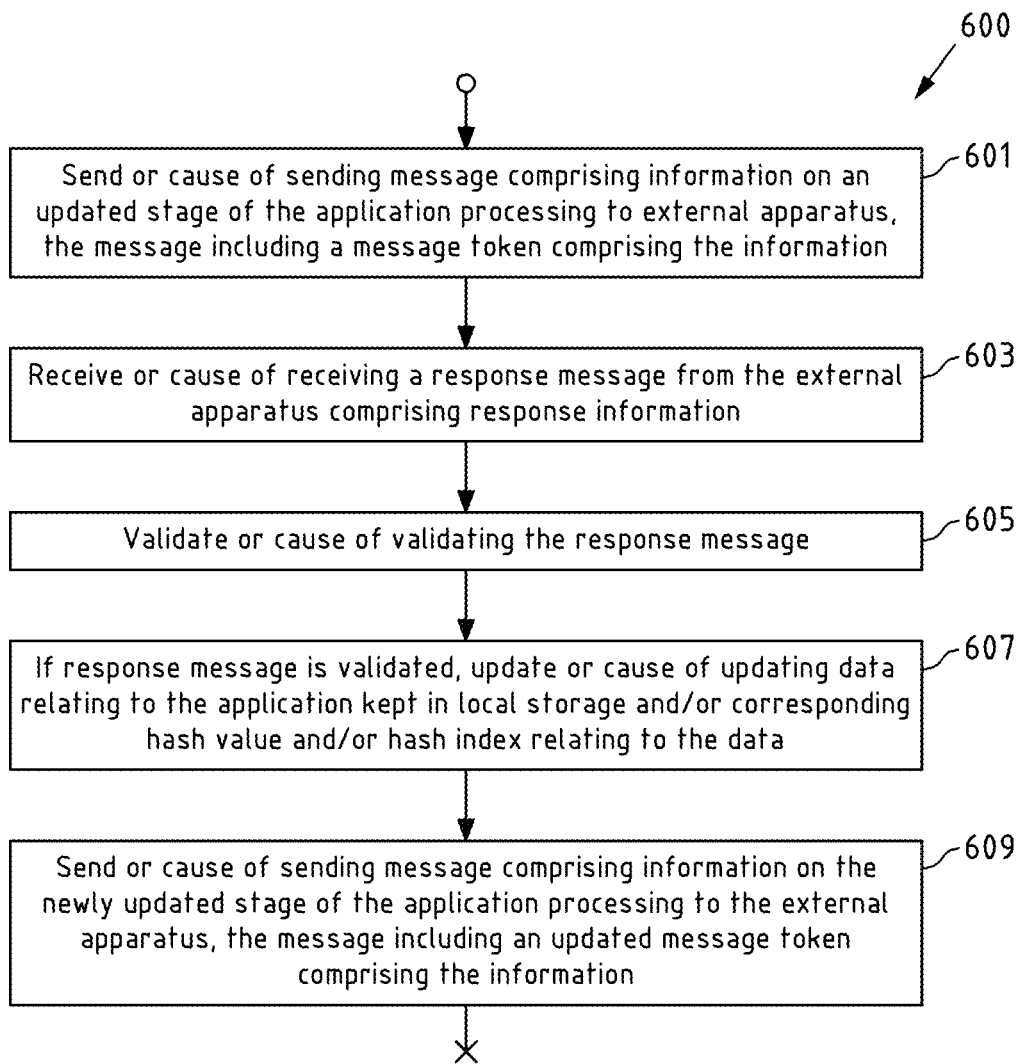
FIG. 6 is an exemplary flow chart illustrating an exemplary embodiment of data communication between a node of the peer-to-peer network and a partner node.

FIG. 6 is an exemplary flow chart 600 illustrating an exemplary embodiment of data communication between node 104 of the peer-to-peer network 100 and partner node 190 after onboarding of partner node 190 is completed. Without limiting the scope of the invention, it is assumed in the following that node 104 of peer-to-peer network 100 as disclosed above with respect to FIG. 1A performs the steps of flow chart 600 in communication with partner node 190 (an example of the external apparatus) as disclosed above with respect to FIG. 1A.

As shown, in a step 601, node 104 sends a message comprising information on an updated stage of an application processed in communication with partner node 190, the message including message token comprising the information. To this end, node 104 may (e.g. using a post-processor 104.9 implemented at node 104 and described further herein) retrieve an endpoint (e.g. a MAC address) related to partner node 190 from partner discoverer 123 based on the decentralized identifier of partner node 190. Node 104 may further combine information on the updated stage of the application processing (e.g. information on an invoice) as message payload with a verifiable credential and may sign the verifiable credential with its private key. Node 104 may then post the message combined with the signed verifiable credential to the endpoint of partner node 190.

Thereby, in an exemplary embodiment, the message is posted to the endpoint of partner node 190 in form of or comprising a QR code, in particular a salted QR code, e.g. secured by the verifiable credential signed by the private key of node 104. The QR code may comprise a link based on which partner node 190 may access an internet address/page holding available said information on the updated stage of the application processing. The QR code may further include a hash value generated based on the decentralized identifier of partner node 190 and/or based on the decentralized identifier of node 104 which may enable the QR code to be verified by partner node 104. The updated status may thus be visible to a user of partner node 190 e.g. via a display of or connected to the partner node 190.

In a step 603, node 104 receives a response message from partner node 190 comprising response information e.g. to verify the application status, e.g. to approve the invoice. In turn, in a step 605, node 104 validates the response message. For example, based on the decentralized identifier of partner node 190 referred to or included in the response message, a digital twin pairing, i.e. a machine-to-machine pairing is established between node 104 and partner node 190. Further, node 104 verifies a key pairing, e.g. verifies that a public key included in or referred to in the response message matches the public key assigned to the partner node 190 in step 301 of FIG. 3 and stored in the securitized portion 140 of memory 110 of the distributed ledger system 1000.

In addition to the key pairing, node 104 is in an exemplary embodiment configured to confirm that a hash value included in or referred to by the received message matches the hash value generated based on at least part of the obtained decentralized identifier. As the hash value is in an exemplary embodiment generated in particular based on endpoint information referred to in a decentralized identifier document of the decentralized identifier of the partner node 190, such hash value confirmation enables ensuring that the node from which node 104 receives the response message in fact corresponds to node 190 that was subject to the onboarding procedure.

As a third level of security, node 104 confirms a partner role included in form of corresponding information in the response message or referred to in the response message. By confirming that the partner role corresponds to a partner role assigned to partner node 190 in an onboarding process and that the partner role allows partner node to send the response message (e.g. to approve the invoice), an additional level of security is provided that may help to prevent consumption of frauded messages by distributed ledger system 1000 e.g. via node 104.

Further, as shown in FIG. 6, in a step 607, if the response message is validated, e.g. if a digital twin machine-to-machine pairing was successfully established between node 104 and partner node 190, if a pairing of keys stored in the securitized portion 140 and included in or referred to by the response message was successfully established, and if a hash value included in or referred to by the response message is confirmed to correspond to a hash value generated upon onboarding of partner node 190 based on at least part of the obtained decentralized identifier, node 104 updates data relating to the application kept in storage of node 104 and/or a corresponding hash value and/or hash index relating to the data kept in memory 110.

Thus, the response message received in step 603 from partner node 190 may for example correspond to approval of an invoice which may have been referred to in the message sent in step 601 such that data relating to the corresponding application may be updated accordingly and/or a corresponding hash value may be updated accordingly. In this way, based on the described communication between node 104 of the peer-to-peer network 100 and the outside partner node 190, a consensus mechanism is established that advantageously enables interoperability between distributed ledger system 1000 and e.g. a further distributed ledger system to which partner node 190 may belong.

Further, referring back to FIG. 6, in a step 609, node 104 sends a message comprising information on the newly updated stage of the application processing (e.g. "invoice approved") to the partner node 190, the message including an updated message token comprising the information.

As in case of the message token sent to partner node 190 in step 601, the message may be posted to the endpoint of partner node 190 in form of or comprising a QR code, in particular a salted QR code, e.g. secured by the verifiable credential signed by the private key of node 104. The QR code may comprise a link based on which partner node 190 may access an internet address/page holding available said information on the newly updated stage of the application processing ("invoice approved"). The QR code may further include a hash value generated based on the decentralized identifier of partner node 190 and/or based on the decentralized identifier of node 104 which may enable the QR code to be verified by partner node 104. The updated status may thus be visible to a user of partner node 190 e.g. via a display of or connected to the partner node 190.

At the same time, node 104 (e.g. a post-processor of node 104 further referred to herein) may store information indicating a successful processing e.g. at a local storage of node 104. Thereby, node 104 may generate and/or update a verifiable credential that may include for example a decentralized identifier of the node 104, the decentralized identifier of partner node 190, payload comprising the statement of the credential and a cryptographical proof, that may ensure integrity of the verifiable credential. The post-processor may in particular create or update the verifiable credential by attaching a verifiable credential (VC) Id of the message and by storing the VC to the local storage of node 104.

In this way, immutability of data processed between node 104 of the peer-to-peer network 100 (of the distributed ledger system 1000) and the outside node 190 may be established.

Figure 7:
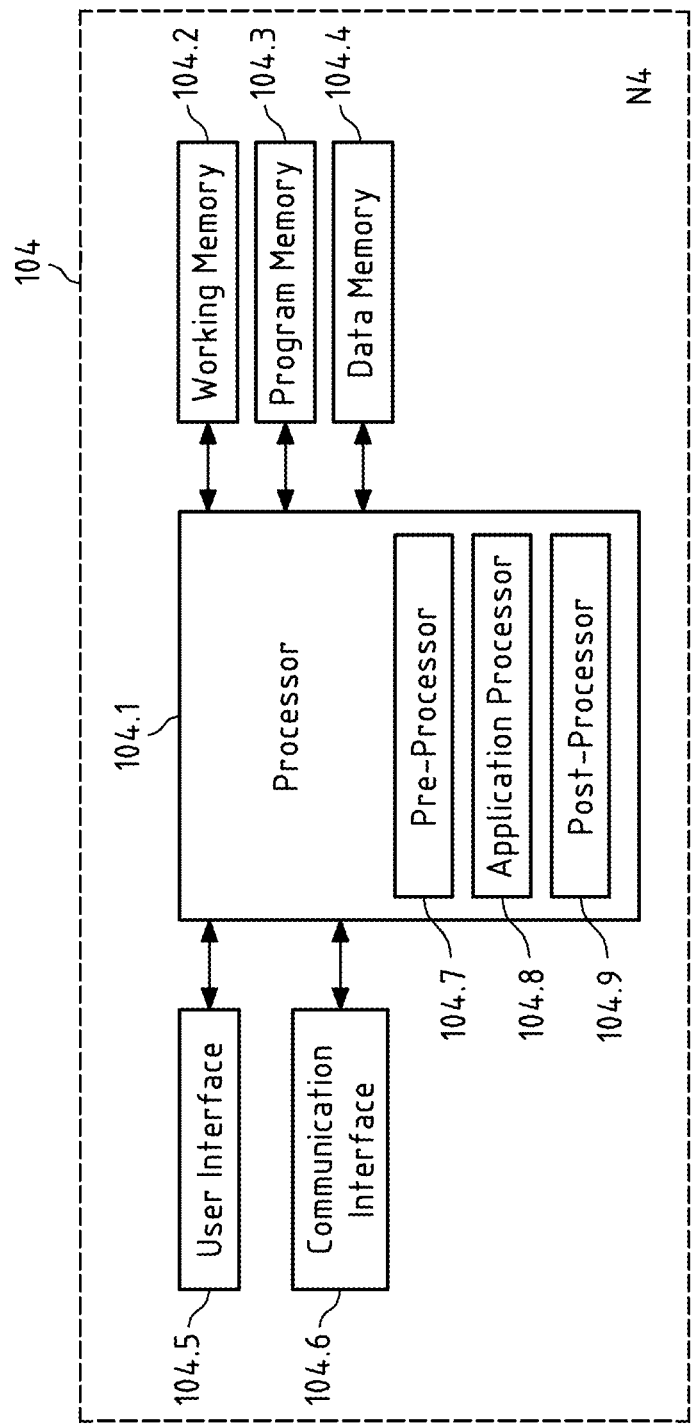
FIG. 7 is a block diagram of an exemplary embodiment of the at least one apparatus according to the first aspect.

FIG. 7 is a block diagram of node 104 of FIG. 1A as an example of the at least one apparatus according to the first aspect.

Node 104 comprises a processor 104.1. Processor 104.1 may represent a single processor or two or more processors, which are for instance at least partially coupled, for instance via a bus. Processor 104.1 may use working memory 104.2 and program memory 104.3 to execute a program code stored in program memory 104.3 (for instance program code causing node 104 to perform embodiments of the different methods, when executed on processor 104.1). Some or all of memories 104.2 and 104.3 may also be included into processor 104.1. One of or both of memories 104.2 and 104.3 may be fixedly connected to processor 104.1 or at least partially removable from processor 104.1. Program memory 104.3 may for instance be a non-volatile memory. It may for instance be a FLASH memory, any of a ROM, PROM, EPROM and EEPROM memory or a hard disc, to name but a few examples. Program memory 104.3 may also comprise an operating system for processor 104.1. Main memory 104.2 may for instance be a volatile memory. It may for instance be a RAM or DRAM memory, to give but a few non-limiting examples. It may for instance be used as a working memory for processor 104.1 when executing an operating system and/or programs.

Data memory 104.4 may be configured to hold available data such as application data in relation to an application processed e.g. between node 104 and partner node 190. Node 104 may comprise data memory 104.4 and/or may be connected to data memory 104.4. Data memory 104 may form part of memory 110 shown in FIG. 1A. In other words, in an exemplary embodiment, node 104 comprises data memory 104.4 that stores at least one portion, in particular a full copy, of the distributed ledger. It is noted that respective nodes 101, 102 and 103 of peer-to-peer network 100 of FIG. 1A (and potential further nodes of peer-to-peer network 100 not shown in FIG. 1A) may respectively comprise corresponding data memories storing at least one portion, in particular a full copy, of the distributed ledger. It is noted that a respective node of peer-to-peer network 100 may not be required to store a full copy of the distributed ledger. In an exemplary embodiment, subgroups of nodes of the peer-to-peer network may store a respective portion of the distributed ledger that may relate to one or more applications processed by the respective nodes of the peer-to-peer network 100 belonging to the subgroup.

Figure 8:
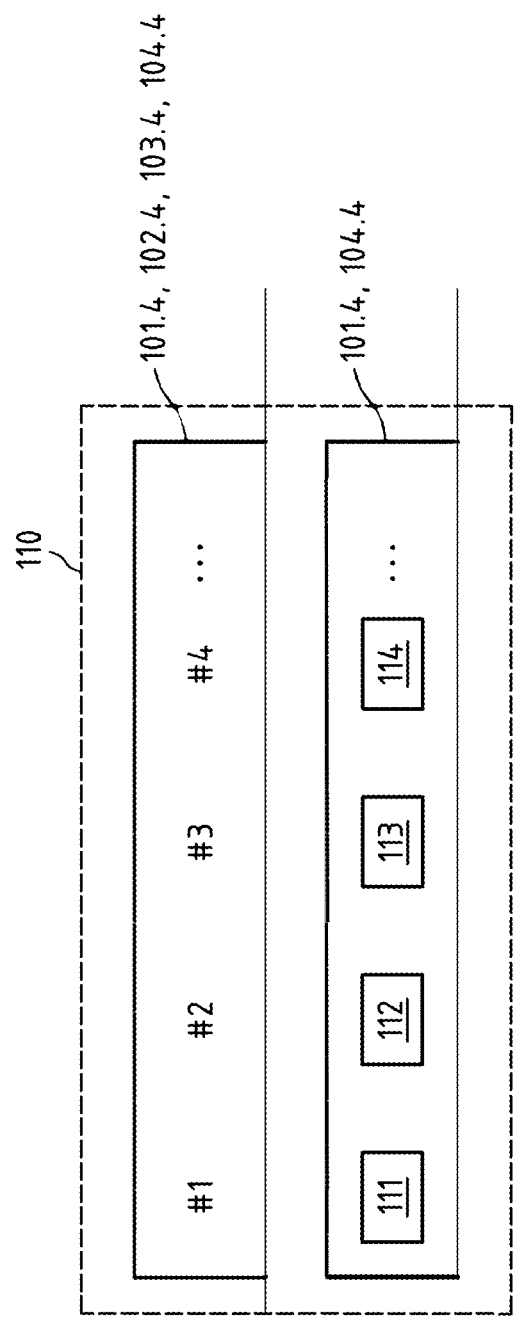
FIG. 8 illustrates exemplary data blocks and corresponding hash indices.

As exemplarily illustrated in FIG. 8, data blocks 111, 112, 113, 114 shown in FIG. 1A may correspond to an application processing, e.g. to a transaction, processed by nodes 101 and 104 of the peer-to-peer network 100 shown in FIG. 1A. As only nodes 101 and 104 of the peer-to-peer network 100 participate in this transaction, the corresponding data blocks 111, 112, 113, 114 may be stored e.g. on respective local storage devices (data memories) 101.4 and 104.4 comprised by or connected to nodes 101 and 104. Further, as exemplarily indicated in FIG. 7, the respective hash values corresponding to respective data blocks and/or the hash indices #1, #2, #3, #4 identifying the respective hash values are stored on respective storage devices 101.4, 102.4, 103.4 and 104.4 comprised by or connected to at least some, in an exemplary embodiment all, nodes of the peer-to-peer network 100, in an exemplary embodiment thus forming the distributed ledger. In other words, in an exemplary embodiment, the distributed ledger comprises a collection of hash indices and/or hash values, wherein a respective hash index and/or hash value is associated with a corresponding data block and/or a corresponding portion of a data block stored at a storage device of or connected to one or more nodes of the peer-to-peer network independently of the distributed ledger.

Referring back to FIG. 7, processor 104.1 further controls one or more communication interfaces 101.6 configured to receive and/or send information. For instance, node 104 may be configured to communicate with any one of nodes 101, 102, 103 of peer-to-peer network 100 and/or with partner node 190 of FIG. 1A. The communication may for instance be based on a (e.g. partly) wired connection and/or a (e.g. partly) wireless connection.

Processor 104.1 further controls a user interface 104.5 configured to present information to a user of node 104 and/or to receive information from such a user. User interface 104.5 may for instance be a user interface by means of which a user may control a stationary or portable personal computer, a server, a server system and/or a mobile device.

The components 104.2-104.6 of node 104 may for instance be connected with processor 104.1 by means of one or more serial and/or parallel busses.

As further shown in FIG. 7, processor 104.1 may further comprise the pre-processor 104.7 configured to receive the message relating to the application from message ingestion API 152.1 in step 509 of FIG. 5, an application processor 104.8 and a post-processor 104.9. Processor 104.1 may comprise any of the pre-processor 104.7, the application processor 104.8 and the post-processor 104.9 in form of respective functional and/or structural unit. Any of the pre-processor 104.7, the application processor 104.8 and the post-processor 104.9 may further be implemented in form of a respective software module and/or function implemented as executable code configured for implementing the respective function at one or more nodes of the peer-to-peer network 100.

Thus, having received the message relating to the application processed between partner node 190 and node 104 of the peer-to-peer network 100, pre-processor 104.7 is configured to extract a decentralized identifier from payload of the received message and to retrieve partner information from partner discoverer 123 based on the extracted decentralized identifier to validate the partner information present in the message payload. The pre-processor 104.7 is further configured to obtain the partner role of partner node 190 based on the extracted decentralized identifier, i.e. the information defining access rights and/or read/write permissions of partner node 190.

Having retrieved and validated partner information from partner discoverer 123, the pre-processor 104.7 then passes the message to application processor 104.8. Application processor 104.8 may in an exemplary embodiment be a custom module that is customized based on one or more applications to be processed between partner node 190 and node 104 of the peer-to-peer network 100. Based on a particular application referred to in the received message, application processor 104.8 processes the message and upon successful processing passes the message to the post-processor 104.9 for further processing.

The post-processor is configured to retrieve an address of partner node 190 (e.g. the partner response service address) from partner discoverer 123. The post-processor is further configured to store information indicating a successful processing of the message e.g. at a local storage (e.g. data memory 104.4) of node 104. For example, in an exemplary embodiment, the post-processor is configured for generating and/or updating a verifiable credential that may include for example a decentralized identifier of the node 104 of the peer-to-peer network 100, the decentralized identifier of partner node 190, payload comprising the statement of the credential and a cryptographical proof, that may ensure integrity of the verifiable credential (VC). The post-processor may in particular create or update the verifiable credential by attaching a VC Id of the message and by storing the VC to the local storage of node 104.

In order to notify the partner node 190 about a status of an application, the message received in step 201 and or a different message received from partner node 190 refers to, the post-processor 104.9 retrieves the endpoint related to partner node 190 from partner discoverer 123 based on the decentralized identifier of partner node 190. Post-processor 104.9 may then combine response message payload with a verifiable credential and may sign the verifiable credential with a private key of node 104. Post-processor 104.9 may then post the message combined with the signed verifiable credential to the endpoint of partner node 190.

The above described onboarding processing of a partner node 410 that may include SDK deployment to partner node 410 to enable application processing between a node 104 of the distributed ledger system 1000 and the partner node 190 outside of distributed ledger system, digital twin based machine-to-machine pairing between node 104 and partner node 190 based on a decentralized identifier of the partner node 104, establishment of public and private keys between node 104 and partner node 190, the keys being secured in a securitized portion 140 of memory 110 of distributed ledger system 1000, the establishment of a hash value based at least on a portion of the decentralized identifier of partner node 190 and the assignment of a partner role to partner node 190 enables data communication between nodes of the distributed ledger system 1000 with nodes not included in the distributed ledger system 1000, in particular with nodes part of a different distributed ledger system.

While a node that communicates with the distributed ledger system such as partner node 190 may in particular correspond to a stationary or portable personal computer, a server, and/or to a server system, in an exemplary embodiment, partner node 190 (as an example of the external apparatus) corresponds to or is part of a mobile device. In such case, SDK 151 corresponds to a client SDK designed for a mobile device. In an exemplary embodiment, the mobile device comprises a thin client corresponding to a node of the distributed ledger system 1000, wherein the thin client comprises in particular the indexer 121 and/or the partner discoverer 123.

In other words, as compared to a case in which a partner node remains a node of its own system such as a non-distributed ledger system, in an exemplary embodiment, the thin client enables the mobile device to become a node of the distributed ledger system 1000. For example, in an exemplary embodiment, the thin client enables the mobile device to be configured for generating hash values and/or hash indices to be stored in memory 110 of distributed ledger system 1000 in association with corresponding data blocks. Thereby, in an exemplary embodiment, the corresponding data blocks are stored in a cloud storage accessible by the mobile device.

Figure 9:
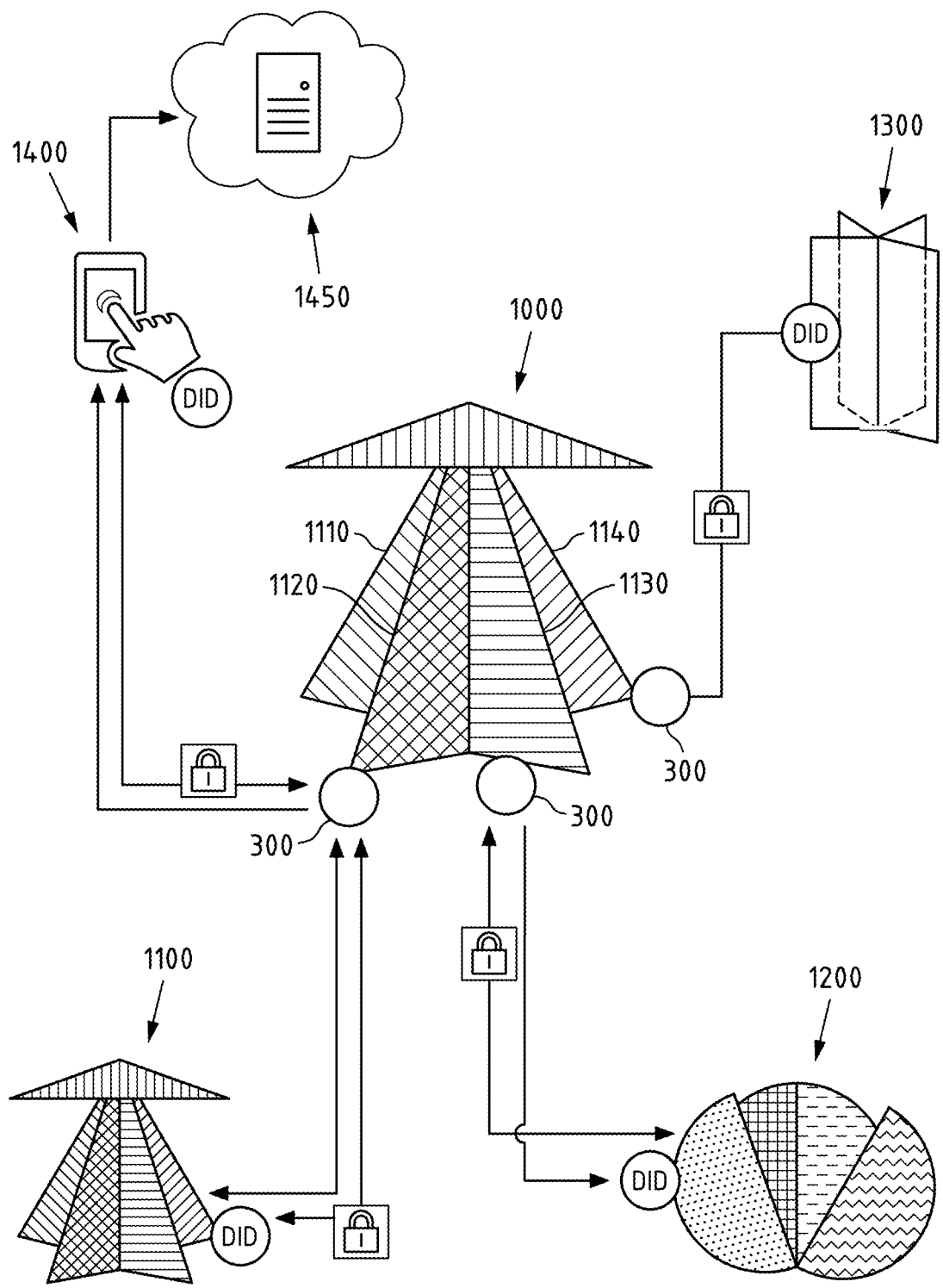
FIG. 9 shows exemplary nodes and/or systems of nodes in communication with the distributed ledger system.

FIG. 9 shows exemplary nodes and/or systems of nodes communication between which and the distributed ledger system 1000 is enabled based on the aspects and embodiments disclosed herein. FIG. 9 schematically illustrates distributed ledger system 1000 that is schematically illustrated with respective layers 1110, 1120, 1130 and 1140 that enable data communication between distributed ledger system 1000 and different nodes and/or systems of nodes. These different layers schematically illustrate a multi-protocol blockchain layer implemented by distributed ledger system 1000. In particular, the multi-protocol blockchain layer implements in an exemplary embodiment Ethereum, Quorum, Corda, and multi-chain protocols. The particular construction/design of the distributed ledger system 1000 allows to communicate with further distributed ledger networks e.g. based on smart contracts as required. The particular construction/design of the distributed ledger system 1000 further allows to communicate with networks not based on Distributed Ledger Technology (DLT).

The decentralized identifier, in particular the DID, as disclosed further herein, enables reliable securitization of communication between Non-DLT endpoints and the distributed ledger system 1000. While the decentralized identifier, e.g. the DID, can be a public address, the securitized portion 140 of a memory 110 of the distributed ledger system 1000, e.g. the HashiCorb vault, may store a hash value based on the decentralized identifier, in particular the DID, and thus ensures that the public key may be shared with a NON-DLT partner, e.g. the partner node 190.

FIG. 9 further shows further distributed ledger system 1100, that may correspond in structure and protocols to distributed ledger system 1000 and that may e.g. be deployed e.g. for an owner different from an owner of distributed ledger system 1000. System 1200 may for example correspond to a Hyperledger Fabric (HLF) system, system 1300 may for example correspond to a non-blockchain system, e.g. to a Software-As-a-Service (SAAS) system, a Platform-As-a-Service (PAAS) system, and/or an Infrastructure-As-a-Service (SAAS) system, and node 1400 may correspond to a mobile device that may store data in a cloud based data storage 1450.

As shown in FIG. 9, endpoints of the distributed ledger system 1000 may be accessed based on different approaches. The distributed ledger system 1000 may be accessed by a system such as distributed ledger system 1100 that shares structure and protocols with the distributed ledger system 1000 or by a different distributed ledger system such as HLF system 1200. If the endpoint accessing the distributed ledger system 1000 (and/or the corresponding node) is HLF endpoint (node), the HLF protocol is activated at distributed ledger system 1000. If the end-point accessing the distributed ledger system 1000 is a Quorum or Corda endpoint, the Quorum or Corda protocol is activated, respectively.

In case the endpoint and/or node accessing the distributed ledger system 1000 is a non-DLT endpoint/node, such as a node of system 1300, a corresponding node, e.g. a node connected to an SAP HANA system may be connected to distributed ledger system 1000 via an internet (e.g. a HTTPS) connection and/or on Premise connection. In such case, the node may have a dedicated decentralized identifier, e.g. a specific DID. In such case, the distributed ledger system 1000 takes over the role of the master of service (MoS). In this case, a respective message to/from the distributed ledger system 1000 (which may be accessible by non-DLT and/or non-blockchain systems, e.g. by an SAP HANA) is made accessible based on decentralized identifier, e.g. DID, based access, encrypted hash value sharing using specific QR Code and/or Peering Data Services (PDS) for peering, to validate immutability. Data may be made immutable in the distributed ledger system, while the non-DLT and/or non-blockchain systems, e.g. the SAP HANA system, takes the role of a sender or receiver of data. Any change in respective data Is communicated to the non-DLT and/or non-blockchain systems, e.g. the SAP HANA system, the non-DLT and/or non-blockchain systems, e.g. the SAP HANA system being required to provide consensus before a corresponding data block may be created at the distributed ledger system.

In an exemplary embodiment, the distributed ledger system may in particular communicate with an application, e.g. an APPLET/Android, provided on a mobile device. To this end, the APPLET/Android may communicate with an application layer of the distributed ledger system 1000 based on a decentralized identifier of the APPLET/Android and/or the mobile device. The distributed ledger system may host hash values and application data to affirm immutability. Alternatively or in addition, the APPLET/Android is configured as a node that is configured to interact with the distributed ledger system 1000 for data communication and immutability. For example, a user may download a corresponding APPLET/Android implementing a node, with an option to connect to a Cloud service such as cloud system 1450 shown in FIG. 9 for local data storage. Actions of the user on such APPLETS (e.g. a booking action) will be automatically communicated to the distributed ledger system 1000.

The following example embodiments are also disclosed:

Embodiment 1

A method comprising:

receiving or causing of receiving a connection establishment message from at least one external apparatus or transmitting or causing of transmitting the connection establishment message to the at least one external apparatus;

obtaining or causing of obtaining a decentralized identifier representative of the external apparatus based on the connection establishment message;

obtaining or causing of obtaining at least one hash value generated based on at least part of the obtained decentralized identifier;

storing or causing of storing the at least one hash value in association with at least part of the decentralized identifier in a securitized portion of a memory of a distributed ledger system comprising the peer-to-peer network based on a consensus processing involving at least a subgroup of the nodes of the peer-to-peer network.

Embodiment 2

The method according to embodiment 1 being performed by at least one apparatus, wherein the at least one apparatus is part of or corresponds to at least one node of a peer-to-peer network comprising at least two nodes, wherein a respective one of the nodes of the peer-to-peer network stores at least a portion of a distributed ledger.

Embodiment 3

The method according to any of embodiments 1 or 2, wherein the decentralized identifier is associated with a decentralized identifier document, the method further comprising:

obtaining or causing of obtaining the at least one hash value based on at least one respective address of at least one corresponding service endpoint and/or based on at least one corresponding public key included in the decentralized identifier document.

Embodiment 4

The method according to any of embodiments 1 to 3, further comprising:
assigning or causing of assigning at least one pair of public and private keys to the external apparatus;
providing or causing of providing the public key to the external apparatus; and
storing or causing of storing at least the private key in association with at least part of the decentralized identifier in the securitized portion of the memory of the distributed ledger based on a consensus processing involving at least a subgroup of the nodes of the peer-to-peer network.

Embodiment 5

The method according to any of embodiments 1 to 4, further comprising:
assigning or causing of assigning at least one partner role to the external apparatus defining access rights and/or read/write permissions of the external apparatus;
storing or causing of storing information setting the at least one partner role in association with at least part of the decentralized identifier in the securitized portion of the memory of the distributed ledger system based on a consensus processing involving at least a subgroup of the nodes of a peer-to-peer network.

Embodiment 6

The method according to any of embodiments 1 to 5, further comprising:
providing or causing of providing the at least one hash value generated based on at least part of the obtained decentralized identifier to the external apparatus, in particular in association with the decentralized identifier.

Embodiment 7

The method according to any of embodiments 1 to 6, further comprising:
establishing or causing establishing a digital twin based machine-to-machine pairing between the external apparatus and at least one node of the peer-to-peer network, in particular based on the decentralized identifier.

Embodiment 8

The method according to any of embodiments 1 to 7, further comprising:
obtaining or causing of obtaining a message relating to an application from the external apparatus;
generating or causing of generating of a message token; and
providing or causing of providing the message token to the external apparatus in response to the received message relating to the application.

Embodiment 9

The method according to embodiment 8, wherein the message token comprises a Quick Response, QR, code configured for enabling the external apparatus to access status information on a status of an application processed between the external apparatus and a node of the peer-to-peer network.

Embodiment 10

The method according to embodiment 9, wherein the QR code comprises the hash value generated based on at least part of the obtained decentralized identifier.

Embodiment 11

The method according to any of embodiments 1 to 10, wherein the distributed ledger comprises a collection of hash indices and/or hash values, wherein a respective hash index and/or hash value is associated with a corresponding data block and/or a corresponding portion of a data block stored at a storage device of or connected to one or more nodes of the peer-to-peer network independently of the distributed ledger.

Embodiment 12

The method according to any of embodiments 1 to 11, wherein the method is performed by the distributed ledger system.

Embodiment 13

The method according to embodiment 12, wherein the distributed ledger system comprises an indexer configured to assign a corresponding hash value at least to a portion of a respective data block and/or sub block of the distributed ledger by applying a hashing function based on the data block and/or based on the sub block independently of a different data block and/or a different sub block.

Embodiment 14

The method according to embodiment 13, wherein a respective relation between hash indices and/or hash values associated with a group of data blocks is stored to be accessible and/or manageable by the indexer.

Embodiment 15

Distributed ledger system, comprising:
at least two nodes of a peer-to-peer network, wherein a respective one of the nodes of the peer-to-peer network stores at least a portion of a distributed ledger;
a software development kit and/or an application programming interface configured for enabling communication of a connection establishment message between at least one of the nodes of the peer-to-peer network and an external apparatus;
a decentralized identifier obtainer configured for obtaining a decentralized identifier representative of the external apparatus based on the connection establishment message;
a hash value obtainer configured for obtaining at least one hash value generated based on at least part of the obtained decentralized identifier;
a consensus controller configured for controlling storing of the at least one hash value in association with at least part of the decentralized identifier in a securitized portion of a memory of the distributed ledger system based on a consensus processing involving at least a subgroup of the nodes of the peer-to-peer network.

Embodiment 16

The distributed ledger system according to embodiment 15, further comprising the partner node; wherein the external apparatus corresponds to or is included in a mobile device comprising:
a thin client enabling the mobile device to perform functions of a node of the distributed ledger system.

Embodiment 17

An apparatus comprising at least one processor and at least one memory that contains program code, wherein the memory and the program code are configured to use the at least one processor to cause an apparatus to perform and/or control at least the method of any of embodiments 1 to 14.

Embodiment 18

An apparatus comprising means for performing the method according to any of embodiments 1 to 14.

Embodiment 19

A tangible computer-readable medium storing computer program code, the computer program code when executed by a processor causing an apparatus to perform and/or control the method according to any of embodiments 1 to 14.

Any presented connection in the described embodiments is to be understood in a way that the involved components are operationally coupled. Thus, the connections can be direct or indirect with any number or combination of intervening elements, and there may be merely a functional relationship between the components.

It will be understood that all presented embodiments are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by at least one apparatus, wherein the at least one apparatus is part of or corresponds to at least one node of a peer-to-peer network comprising at least two nodes, wherein a respective one of the nodes of the peer-to-peer network stores at least a portion of a distributed ledger; the method comprising:
receiving or causing of receiving a connection establishment message from at least one external apparatus or transmitting or causing of transmitting the connection establishment message to the at least one external apparatus;
obtaining or causing of obtaining a decentralized identifier representative of the external apparatus based on the connection establishment message;
obtaining or causing of obtaining at least one hash value generated based on at least part of the obtained decentralized identifier;
storing or causing of storing the at least one hash value in association with at least part of the decentralized identifier in a securitized portion of a memory of a distributed ledger system comprising the peer-to-peer network based on a consensus processing involving at least a subgroup of the nodes of the peer-to-peer network.

2. The method according to claim 1, wherein the decentralized identifier is associated with a decentralized identifier document, the method further comprising:
obtaining or causing of obtaining the at least one hash value based on at least one respective address of at least one corresponding service endpoint and/or based on at least one corresponding public key included in the decentralized identifier document.

3. The method according to claim 1, further comprising:
assigning or causing of assigning at least one pair of public and private keys to the external apparatus;
providing or causing of providing the public key to the external apparatus; and
storing or causing of storing at least the private key in association with at least part of the decentralized identifier in the securitized portion of the memory of the distributed ledger based on a consensus processing involving at least a subgroup of the nodes of the peer-to-peer network.

4. The method according to claim 1, further comprising:
assigning or causing of assigning at least one partner role to the external apparatus defining access rights and/or read/write permissions of the external apparatus;
storing or causing of storing information setting the at least one partner role in association with at least part of the decentralized identifier in the securitized portion of the memory of the distributed ledger system based on a consensus processing involving at least a subgroup of the nodes of a peer-to-peer network.

5. The method according to claim 1, further comprising:
providing or causing of providing the at least one hash value generated based on at least part of the obtained decentralized identifier to the external apparatus, in particular in association with the decentralized identifier.

6. The method according to claim 1, further comprising:
establishing or causing establishing a digital twin based machine-to-machine pairing between the external apparatus and at least one node of the peer-to-peer network, in particular based on the decentralized identifier.

7. The method according to claim 1, further comprising:
obtaining or causing of obtaining a message relating to an application from the external apparatus;
generating or causing of generating of a message token; and
providing or causing of providing the message token to the external apparatus in response to the received message relating to the application.

8. The method according to claim 7, wherein the message token comprises a Quick Response, QR, code configured for enabling the external apparatus to access status information on a status of an application processed between the external apparatus and a node of the peer-to-peer network.

9. The method according to claim 8, wherein the QR code comprises the hash value generated based on at least part of the obtained decentralized identifier.

10. The method according to claim 1, wherein the distributed ledger comprises a collection of hash indices and/or hash values, wherein a respective hash index and/or hash value is associated with a corresponding data block and/or a corresponding portion of a data block stored at a storage device of or connected to one or more nodes of the peer-to-peer network independently of the distributed ledger.

11. The method according to claim 1, wherein the method is performed by the distributed ledger system.

12. The method according to claim 11, wherein the distributed ledger system comprises an indexer configured to assign a corresponding hash value at least to a portion of a respective data block and/or sub block of the distributed ledger by applying a hashing function based on the data block and/or based on the sub block independently of a different data block and/or a different sub block.

13. The method according to claim 12, wherein a respective relation between hash indices and/or hash values associated with a group of data blocks is stored to be accessible and/or manageable by the indexer.

14. Distributed ledger system, comprising:
at least two nodes of a peer-to-peer network, wherein a respective one of the nodes of the peer-to-peer network stores at least a portion of a distributed ledger;
a software development kit and/or an application programming interface configured for enabling communication of a connection establishment message between at least one of the nodes of the peer-to-peer network and an external apparatus;
a decentralized identifier obtainer configured for obtaining a decentralized identifier representative of the external apparatus based on the connection establishment message;
a hash value obtainer configured for obtaining at least one hash value generated based on at least part of the obtained decentralized identifier;
a consensus controller configured for controlling storing of the at least one hash value in association with at least part of the decentralized identifier in a securitized portion of a memory of the distributed ledger system based on a consensus processing involving at least a subgroup of the nodes of the peer-to-peer network.

15. The distributed ledger system according to claim 14, further comprising the external apparatus; wherein the external apparatus corresponds to or is included in a mobile device comprising:
a thin client enabling the mobile device to perform functions of a node of the distributed ledger system.

16. An apparatus, wherein the apparatus is part of or corresponds to at least one node of a peer-to-peer network comprising at least two nodes, wherein a respective one of the nodes of the peer-to-peer network stores at least a portion of a distributed ledger; wherein the apparatus comprises at least one processor and at least one memory that contains program code, wherein the memory and the program code are configured to, with the at least one processor, cause an apparatus to perform and/or control:
receiving or causing of receiving a connection establishment message from at least one external apparatus or transmitting or causing of transmitting the connection establishment message to the at least one external apparatus;
obtaining or causing of obtaining a decentralized identifier representative of the external apparatus based on the connection establishment message;
obtaining or causing of obtaining at least one hash value generated based on at least part of the obtained decentralized identifier;
storing or causing of storing the at least one hash value in association with at least part of the decentralized identifier in a securitized portion of a memory of a distributed ledger system comprising the peer-to-peer network based on a consensus processing involving at least a subgroup of the nodes of the peer-to-peer network.

17. The apparatus according to claim 16, wherein the memory and the program code are further configured to, with the at least one processor, cause the apparatus to perform and/or control:
obtaining or causing of obtaining the at least one hash value based on at least one respective address of at least one corresponding service endpoint and/or based on at least one corresponding public key included in the decentralized identifier document.

18. The apparatus according to claim 16, wherein the memory and the program code are further configured to, with the at least one processor, cause the apparatus to perform and/or control:
assigning or causing of assigning at least one pair of public and private keys to the external apparatus;
providing or causing of providing the public key to the external apparatus; and
storing or causing of storing at least the private key in association with at least part of the decentralized identifier in the securitized portion of the memory of the distributed ledger based on a consensus processing involving at least a subgroup of the nodes of the peer-to-peer network.

19. The apparatus according to claim 16, wherein the memory and the program code are further configured to, with the at least one processor, cause the apparatus to perform and/or control:

assigning or causing of assigning at least one partner role to the external apparatus defining access rights and/or read/write permissions of the external apparatus;

storing or causing of storing information setting the at least one partner role in association with at least part of the decentralized identifier in the securitized portion of the memory of the distributed ledger system based on a consensus processing involving at least a subgroup of the nodes of a peer-to-peer network.

20. The apparatus according to claim 16, wherein the memory and the program code are further configured to, with the at least one processor, cause the apparatus to perform and/or control:

providing or causing of providing the at least one hash value generated based on at least part of the obtained decentralized identifier to the external apparatus, in particular in association with the decentralized identifier.

* * * * *